United States Patent
Kil et al.

[11] Patent Number: 6,028,948
[45] Date of Patent: Feb. 22, 2000

[54] SURFACE ANOMALY-DETECTION AND ANALYSIS METHOD

[75] Inventors: David H. Kil; Frances B. Shin; David W. Rose, all of Glendale, Ariz.

[73] Assignee: Lockheed Martin Corporation, Goodyear, Ariz.

[21] Appl. No.: 08/999,216

[22] Filed: Dec. 29, 1997

[51] Int. Cl.$^7$ .............................. G06K 9/00; G06K 9/42; G06K 9/20; E01C 23/02
[52] U.S. Cl. .......... 382/108; 382/149; 382/259; 382/263; 382/283; 404/107
[58] Field of Search ................... 382/104, 108, 382/149, 259, 260, 263, 282, 283, 100; 404/17, 72, 107; 356/392, 394; 702/40; 73/146

[56] References Cited

U.S. PATENT DOCUMENTS

| | | | |
|---|---|---|---|
| 4,958,306 | 9/1990 | Powell et al. | 702/40 |
| 5,163,319 | 11/1992 | Spies et al. | 73/146 |
| 5,301,129 | 4/1994 | McKaughan et al. | 382/149 |
| 5,466,934 | 11/1995 | Adams et al. | 250/307 |
| 5,544,256 | 8/1996 | Brecher et al. | 382/149 |
| 5,684,898 | 11/1997 | Brady et al. | 382/282 |
| 5,803,661 | 9/1998 | Lemelson | 404/75 |
| 5,923,430 | 7/1999 | Worster et al. | 356/394 |

OTHER PUBLICATIONS

Road surface inspection using laser scanners adapted for the high precision 3D measurements of large flat surfaces, Talbot et al; IEEE Proceedings on 3_D Digital Imaging and Modeling, ISBN: 0–8186–794–3, pp. 303–310, May 1997.

Philippe Delagnes and Dominique Barba, "A Markov Random Field for Rectilinear Structure Extraction in Pavement Distress Image Analysis", Proc. IEEE Int'l Conference on Image Processing, 1995 pp. 446–449.

Roadware Website Sep. 23, 1997.

*Primary Examiner*—Amelia Au
*Assistant Examiner*—Mehrdad Dastouri
*Attorney, Agent, or Firm*—Lowell W. Gresham; Jordan M. Meschkow; Meschkow & Gresham, P.L.C.

[57] ABSTRACT

A method (30) is provided for the detection and analysis of anomalies (32) in a road surface (36). An image (34) of the road surface (36) is obtained (82) wherein traffic control markings (76) are masked (88). The image (34) is filtered (90) and a pixel map (92) is produced (98). The pixel map (92) is partitioned (112) into a multiplicity of subimages (108). For each subimage (108), anomaly parameters are identified (120) and a status characteristic is determined (124) and assigned (136). A subimage map (138) is produced (142) depicting the subimages (108) and their status characteristics. A determination (156) is made as to which subimages (108) contain anomalies (32). Anomaly-containing subimages (108) are grouped (158) into anomalous objects (152). For each anomalous object (152), an object type (162) is determined (160) and assigned (164). An object map (154) is then produced (166) depicting the anomalous objects (152).

24 Claims, 22 Drawing Sheets

SURFACE ANOMALY-DETECTION AND ANALYSIS METHOD

TECHNICAL FIELD OF THE INVENTION

The present invention relates to the field of surface analysis. More specifically, the present invention relates to a method for the detection and analysis of anomalies in an image of a surface.

BACKGROUND OF THE INVENTION

An analysis of the surface of an object is often utilized as a screening device to determine the acceptability of the object, to forestall damage to or destruction of the object, or as an aid in effecting repairs to the object once damage has occurred. This surface analysis most often entails the detection and analysis of anomalies of or within the surface.

For example, the detection and analysis of the surface of an egg may be used to determine the salability of the egg. The analysis may determine that the egg is suitable for retail sale, e.g., it is unlikely to break during normal handling and has a pleasing appearance. On the other hand, the analysis may determine that the egg is suitable for commercial sale, e.g., while it is unlikely to break during normal handling, it has lumps or other shell deformities, hence would not appeal to the retail buyer. Again, analysis may determine that the egg is suitable for processing only, e.g., it is likely to break in normal handling, hence is suitable for conversion to powdered eggs.

In another example, normal wear may cause the surface of a road to develop cracks, potholes, etc. An analysis of the surface of the road would assist maintenance engineers in determining where and what type of repairs are needed. In addition, data from the surface analysis may be used by design engineers to improve road design, thereby reducing the maintenance requirements of future roads.

One form of surface analysis currently in use is visual inspection. Unfortunately, good visual inspection requires both a trained inspector and a significant inspection time, each of which is expensive. Visual inspection is also subject to inattentiveness errors, in which operator fatigue and attention span are factors. For these and other reasons, visual inspection techniques are problematical at best.

A common solution to visual inspection is some form of automated inspection. In the egg-surface example above, the eggs may be rotated while an automated inspection system is used to detect and analyze anomalies upon and/or within their shells. Those eggs with strong, blemish-free shells would then be allocated for retail sales, those with strong marred shells for commercial sales, and those with weak shells for processing. For simple anomalies, such as cracks, utilizing existing anomaly-detection techniques works well.

In the road-surface example above, an automated system may include a vehicle traveling the road while capturing either a continuous image (e.g., videotape) or a series of overlapping images (e.g., photographs) of the road surface. The image(s) thus captured may then be analyzed, either later or in real time, and surface anomalies detected. These detected anomalies may then be analyzed, classed, and mapped, with the resultant map providing the requisite data to the maintenance and design engineers.

Unlike the egg, the road does not have a simple surface with few potential anomalies. For example, road-surface anomalies include line anomalies, area anomalies, and other anomalies.

Line anomalies (cracks) may be either dark (open cracks) or light (dirt-filled cracks). Either dark or light line anomalies include longitudinal cracks, transverse cracks, oblique cracks, fatigue (crosshatched) cracks, and block cracks.

Area anomalies may be either linear (sealed cracks) or block (P2, or patches and potholes). Linear-area anomalies include sealed longitudinal cracks, sealed transverse cracks, sealed oblique cracks, sealed fatigue cracks, and sealed block cracks. Block-area anomalies include both potholes and patches (sealed potholes).

Other anomalies include road edges, road seams, manhole covers, drainage grates, speed bumps, traffic markings, road debris, and anything else upon or in the surface of the road.

Existing automated road-surface anomaly-detection techniques normally utilize rectilinear line and edge detection. This allows the detection of dark-line and transitional anomalies. The dark-line detection techniques normally allow the detection of longitudinal dark-line anomalies, e.g., open cracks along the direction of travel, transverse dark-line anomalies, e.g., open cracks across the direction of travel, and block dark-line anomalies, e.g., open cracks both along and across the direction of travel and "breaking" the surface into blocks. The transitional detection techniques usually detect transitions in surface texture and/or color and indicate a thin line or "crack" at the transition boundary.

A problem exists when conventional techniques are used to detect oblique line anomalies, e.g., cracks running diagonally to the direction of travel. Oblique line anomalies usually have insufficient existence in the longitudinal and transverse domains at any given point to be detectable using conventional techniques.

A problem exists when conventional techniques are used to detect light-line anomalies, e.g., cracks filled with dirt, sand, etc. Light-line anomalies usually offer insufficient contrast to the road surface to be detectable using conventional techniques.

A problem exists when conventional techniques are used to detect linear-area anomalies, e.g., cracks that have previously been repaired and appear as wide lines or linear areas on the road. Transitional detection techniques usually cause linear-area anomalies, if detectable at all, to be erroneously detected as a pair of parallel thin-line anomalies.

A problem exists when conventional techniques are used to detect rough block area anomalies, e.g., potholes, etc., and smooth block-area anomalies, e.g., patches, etc. Transitional detection techniques usually cause rough and smooth block-area anomalies, if detectable at all, to be erroneously detected as block line anomalies.

A like problem exists when conventional techniques are used to detect edge anomalies, e.g., road surface edges, pavement ends, etc., and joint anomalies, e.g., concrete joins, etc. Transitional detection techniques usually cause edge and joint anomalies, if detectable at all, to be erroneously detected as longitudinal or transverse line anomalies.

A problem exists when conventional techniques are used to detect fatigue anomalies, e.g., crosshatch or fatigue cracks, etc. Due to the high-density cracking found in fatigue anomalies, they are often interpreted as rough-area anomalies. Therefore, transition detection techniques usually cause fatigue anomalies, if detectable at all, to be erroneously detected as block line anomalies.

What is needed, therefore, is an automated process consisting of techniques by which at least a preponderance of surface anomalies may be detected, and by which detected anomalies may be analyzed and correctly classed as to anomaly type.

SUMMARY OF THE INVENTION

Accordingly, it is an advantage of the present invention that a process for the detection and analysis of surface anomalies is provided.

It is another advantage of the present invention that the provided process can detect and distinguish between dark- and light-line anomalies.

It is another advantage of the present invention that the provided process can detect and distinguish between longitudinal, transverse, block, oblique, and fatigue dark-line anomalies.

It is another advantage of the present invention that the provided process can detect and distinguish between longitudinal, transverse, block, oblique, and fatigue light-line anomalies.

It is another advantage of the present invention that the provided process can detect and distinguish between line anomalies and joint anomalies.

It is another advantage of the present invention that the provided process can detect and distinguish between line anomalies and area anomalies.

It is another advantage of the present invention that the provided process can detect and distinguish between linear-area anomalies and block-area anomalies.

It is another advantage of the present invention that the provided process can detect and distinguish between longitudinal, transverse, block, oblique, and fatigue linear-area anomalies.

It is another advantage of the present invention that the provided process can detect and distinguish between block-area anomalies and edge anomalies.

It is another advantage of the present invention that the provided process can detect and distinguish between rough and smooth block-area anomalies.

The above and other advantages of the present invention are realized in one form by a method for the detection and analysis of anomalies in a surface. This method includes obtainment of an image of the surface including at least one anomaly, filtration of the image to enhance a depiction of the anomaly by removing non-anomalous features of the image, production of a pixel map of the surface, and partitionment of the pixel map into a multiplicity of subimages, each of which includes a plurality of pixels. This method also includes assignment of a status characteristic to each subimage in response to any anomaly depicted therein. This method additionally includes formation of an anomalous object in response to the status characteristics of the subimages and corresponding to the anomaly, and production of an object map of the surface depicting a location of the anomalous object.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
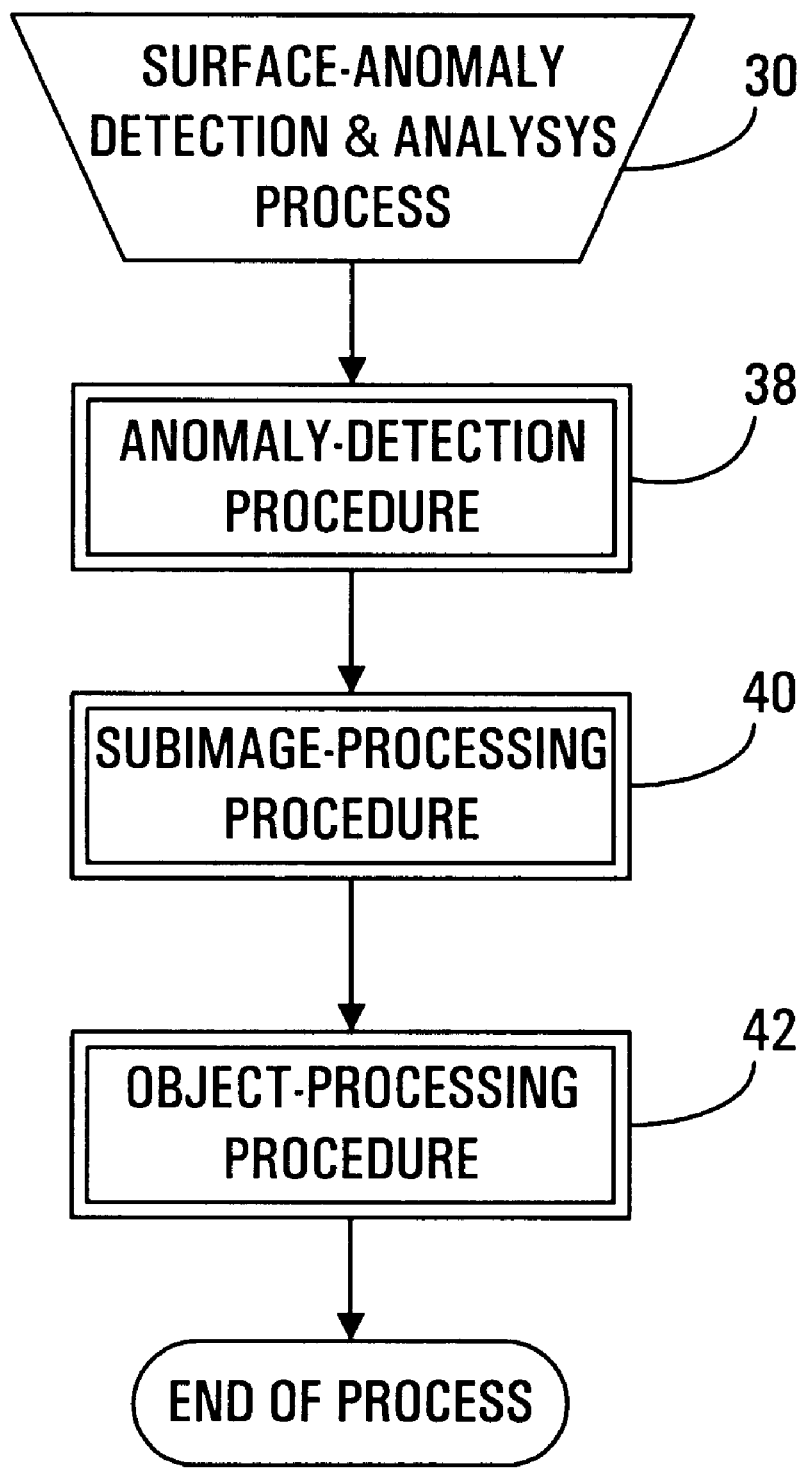
FIG. 1 depicts a flowchart of a process to detect and analyze surface anomalies in accordance with a preferred embodiment of the present invention.
Figure 2:
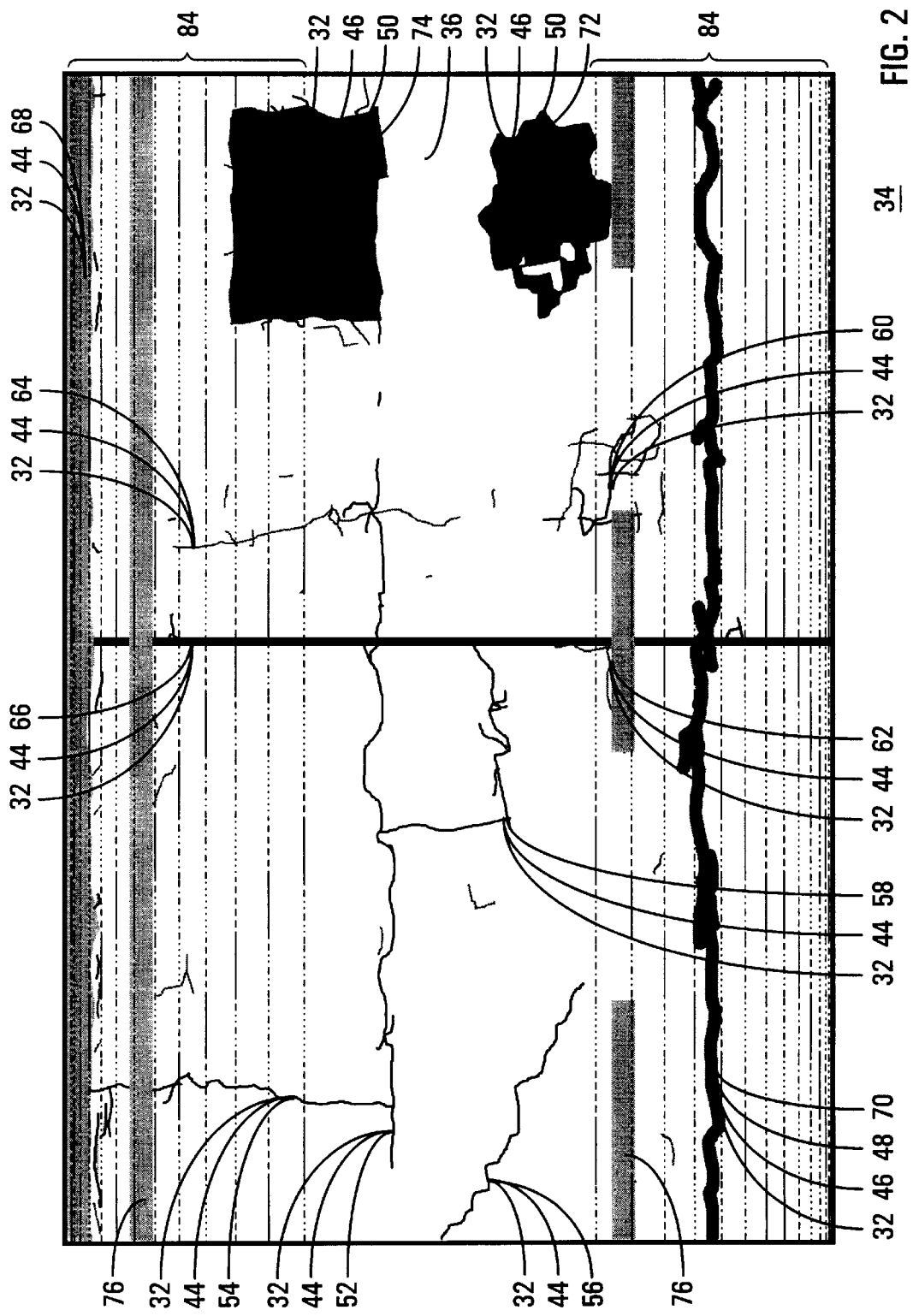
FIG. 2 depicts a schematic representation of an image of a road surface in accordance with a preferred embodiment of the present invention.

In accordance with a preferred embodiment of the present invention, FIG. 1 depicts a flowchart of a process 30 to detect and analyze surface anomalies 32, and FIG. 2 depicts a schematic representation of an image 34 of a road surface 36. The following discussion refers to FIGS. 1 and 2.

Process 30 includes an anomaly-detection procedure 38, a subimage-processing procedure 40, and an anomalousobject-processing procedure 42. Process 30 detects and analyzes anomalies 32 of surface 36 depicted in image 34 through image processing. Each of procedures 38, 40, and 42 performs a different form of image processing in order to detect and analyze a plurality of different anomalies 32. FIG. 2 depicts a representative sampling of these different anomalies 32.

In the preferred embodiment, surface 36 is a road surface 36. This discussion will refer throughout to surface 36 as road surface 36 and to anomalies 32 and other features of surface 36 as anomalies 32 and other features peculiar to road surface 36. Those skilled in the art, however, will appreciate that, by analogy, road surface 36 may be any other type of surface 36, with anomalies 32 and other features peculiar to that other surface 36.

Image 34 schematically depicts a section of road surface 36 having a plurality of anomalies 32. Anomalies 32 may be either line anomalies 44 or area anomalies 46, with area anomalies 46 being either linear-area anomalies 48 or block-area anomalies 50.

Line anomalies 44 are primarily fineline phenomena and transitional phenomena. For road surface 36, fineline phenomena include cracks and road joints, and transition phenomena include road edges and the edges of area anomalies. The principal types of line anomalies 44 detectable by process 30 are delineated in Table 1 below, with a representative selection thereof depicted in FIG. 2.

TABLE 1

Line Anomalies

| ANOMALY | REF. NO. |
|---|---|
| dark longitudinal crack | 52 |
| dark transverse crack | 54 |
| dark oblique crack | 56 |
| dark block crack | 58 |
| dark fatigue crack | 60 |
| light longitudinal crack | 62 |
| light transverse crack | 64 |
| light oblique crack | not shown |
| light block crack | not shown |
| light fatigue crack | not shown |
| longitudinal road joint | not shown |
| transverse road joint | 66 |
| oblique road joint | not shown |
| longitudinal road edge | 68 |
| transverse road edge | not shown |
| oblique road edge | not shown |

Dark cracks, normally appearing as dark lines in image 34, are cracks in road surface 36 that are open, i.e., not filled with dirt or other debris. Light cracks, normally appearing as light lines in image 34, are cracks in road surface 36 that are filled with dirt, sand, or other debris.

Longitudinal cracks and road joints are those primarily positioned lengthwise to road surface 36.

Transverse cracks and road joints are those primarily positioned across road surface 36.

Oblique cracks and road joints are those primarily positioned obliquely across road surface 36.

Block cracks are longitudinal and transverse cracks breaking road surface 36 into blocks.

Fatigue cracks are fine block cracks, often accompanied by depression, indicative of a breakdown in road surface 36.

Road joints are differentiated from cracks by their straightness. That is, road joints are effectively straight cracks.

Road edges are the demarcation between pavement and non-pavement for road surface 36. Road edges are normally relatively straight and longitudinal, but may also represent transverse or oblique pavement ends, overburdens (e.g., sand or mud across road surface 36), washouts, etc.

Linear-area anomalies 48 are primarily wideline and extreme-transition phenomena. For road surface 36, wideline and extreme-transition phenomena include sealed cracks, i.e., cracks that have already been repaired, certain types of road joints, and the edges of areas having extreme variations transitions in color or texture from the background of road surface 36. The principal types of linear-area anomalies 48 detectable by process 30 are delineated in Table 2 below, with a representative selection thereof depicted in FIG. 2.

TABLE 2

Linear-Area Anomalies

| ANOMALY | REF. NO. |
|---|---|
| longitudinal sealed crack | 70 |
| transverse sealed crack | not shown |
| oblique sealed crack | not shdwn |
| block sealed crack | not shown |
| fatigue sealed crack | not shown |

Block-area anomalies 50 are primarily area phenomena. For road surface 36, area phenomena include P2s, i.e., patches and potholes. The principal types of block-area anomalies 50 detectable by process 30 are delineated in Table 3 below, with a representative selection thereof depicted in FIG. 2.

TABLE 3

Block-Area Anomalies

| ANOMALY | REF. NO. |
|---|---|
| pothole | 72 |
| patch | 74 |

Potholes 72 are areas of road-surface 36 that have broken down. Potholes 72 are identified as area phenomena because the area inside the edge of potholes 72 is irregular (rough) and different from road surface 36.

Patches 74 are repaired potholes 72, and are identified as area phenomena because the area inside the edge of patches 74 is regular (smooth) and different from road surface 36.

Additionally, image 34 depicts a plurality of non-anomalous features 76 of road surface 36. In the preferred embodiment, non-anomalous features 76 are traffic-control markings 76, e.g., white and yellow lines, speed-limit markings, etc.

Figure 3:
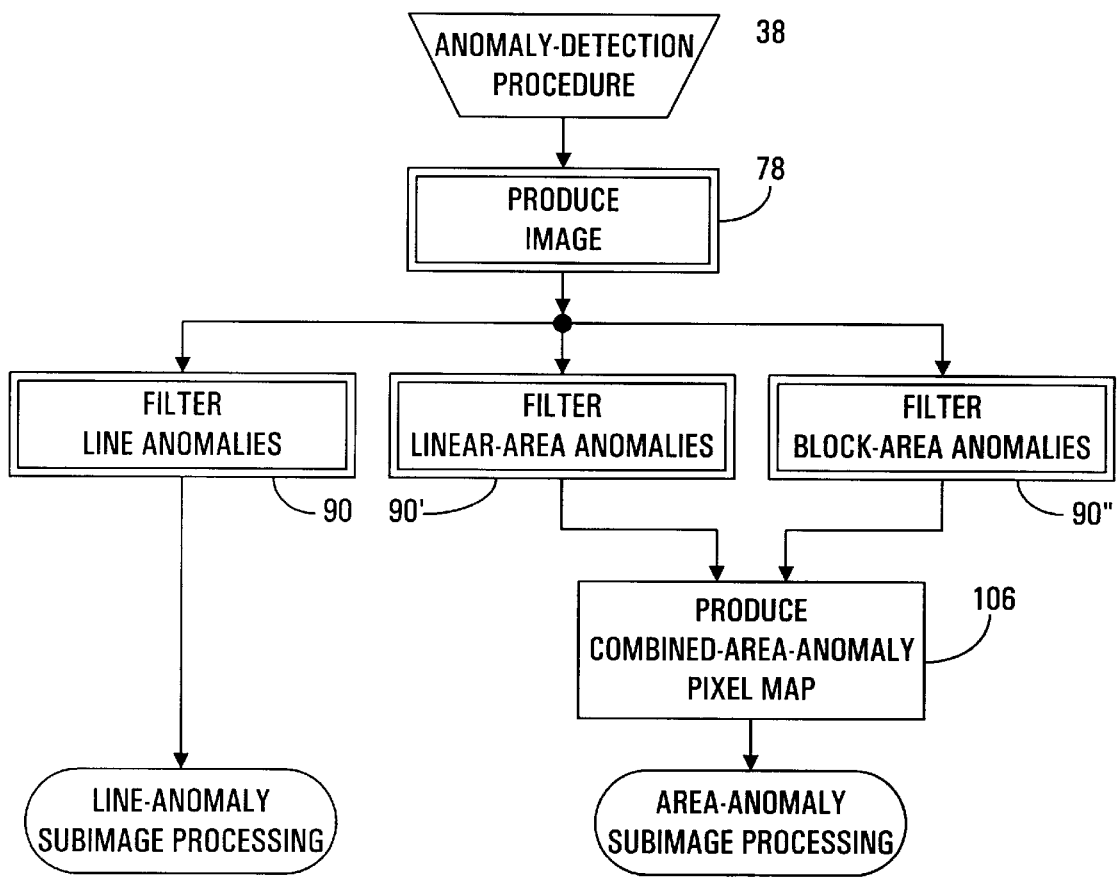
FIG. 3 depicts a flowchart of an anomaly-detection procedure in accordance with a preferred embodiment of the present invention.
Figure 4:
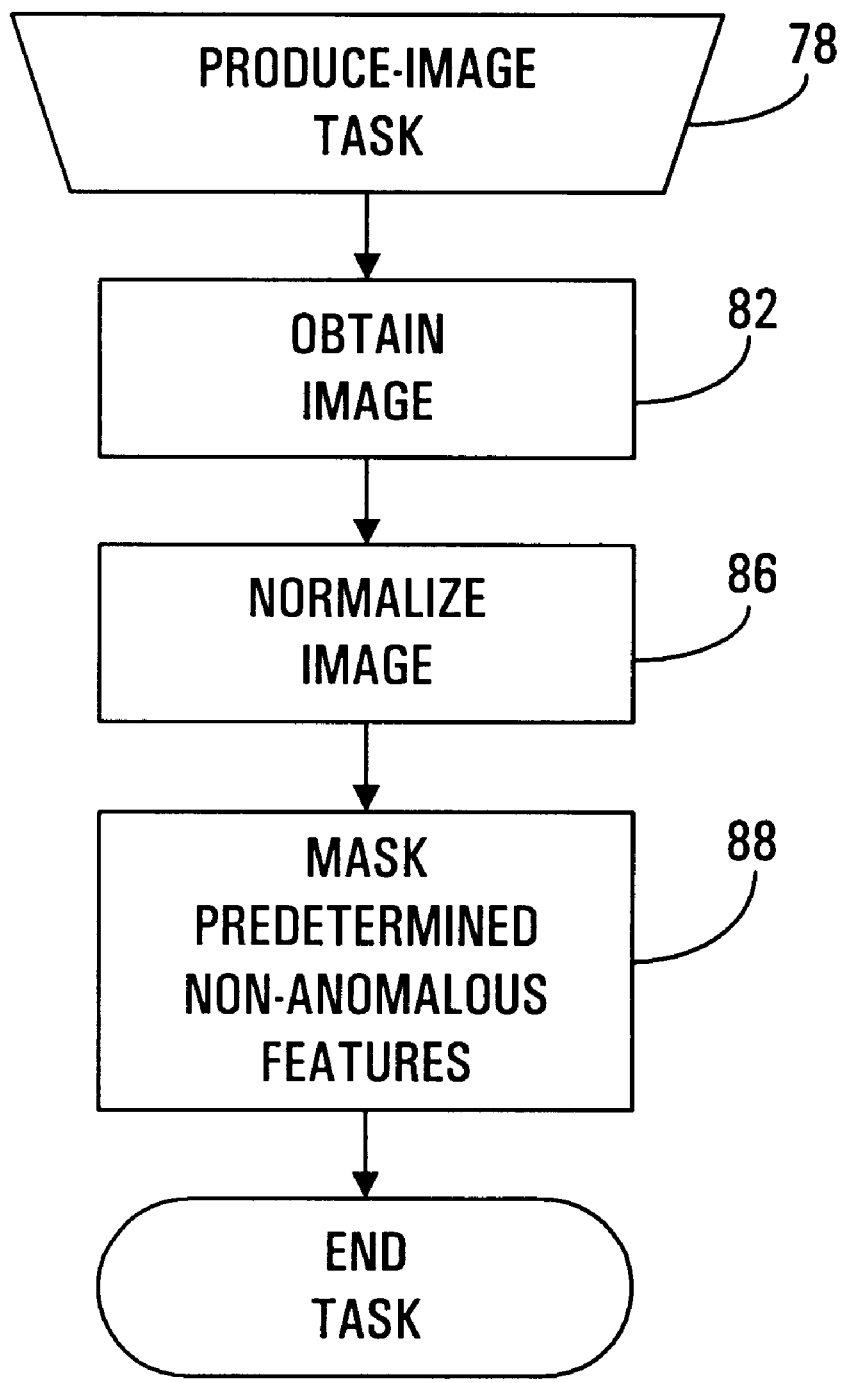
FIG. 4 depicts a flowchart of a task to produce images in accordance with a preferred embodiment of the present invention.
Figure 5:
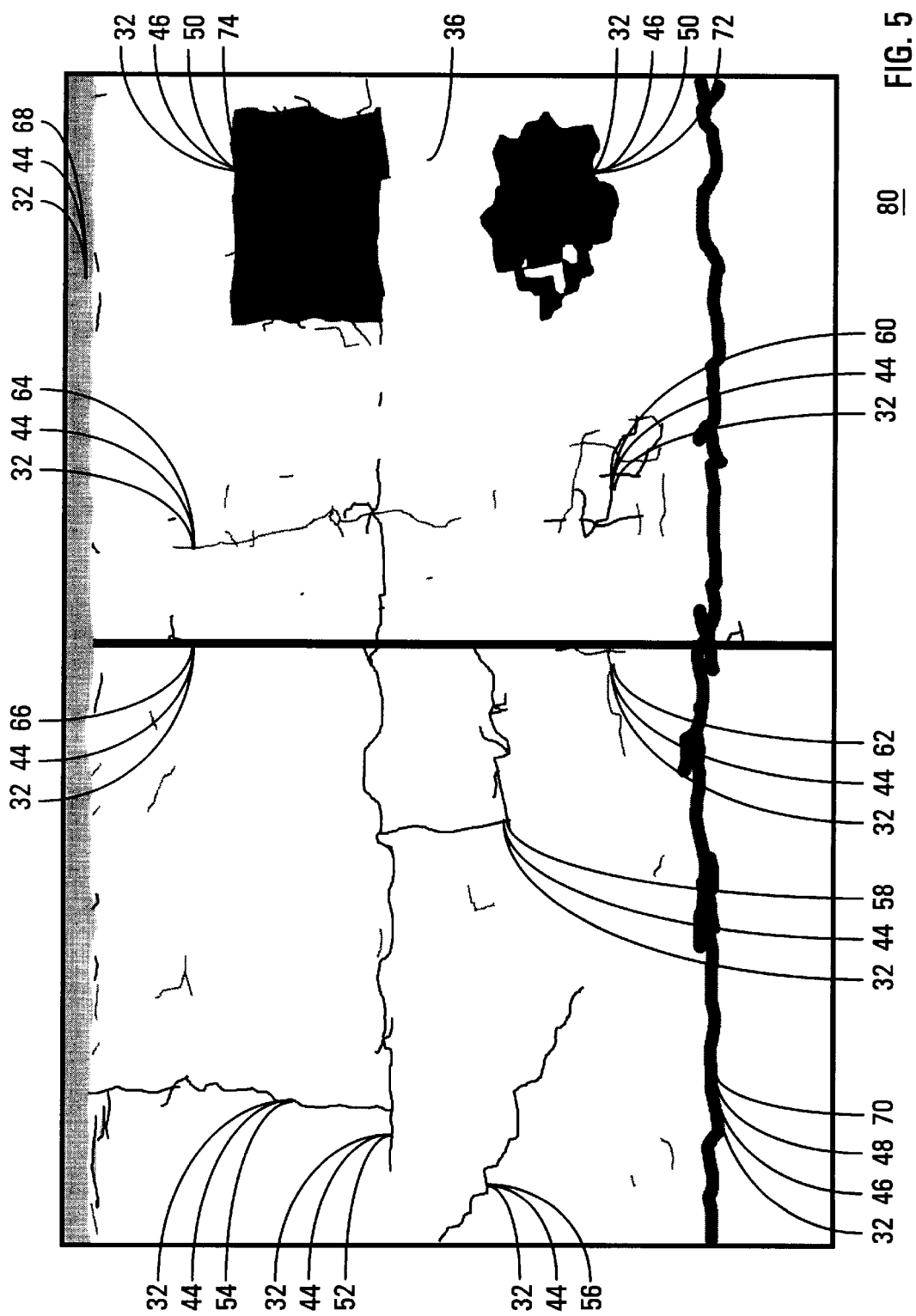
FIG. 5 depicts a schematic representation of a normalized and masked image of the road surface of FIG. 2 in accordance with a preferred embodiment of the present invention.

In accordance with a preferred embodiment of the present invention, FIG. 3 depicts a flowchart of anomaly-detection procedure 38. FIG. 4 depicts a flowchart of a task 78 to produce images 34. FIG. 5 depicts a schematic representation of a normalized and masked image 80 of road surface 36. The following discussion refers to FIGS. 2, 3, 4, and 5.

Process 30 (FIG. 1) begins with anomaly-detection procedure 38, which is diagrammed in FIG. 3. Anomaly-detection procedure 38 has a task 78 to produce image 34 of surface 36.

In task 78, elaborated in FIG. 4, a subtask 82 obtains image 34 of road surface 36. For purposes of clarity, image 34 is depicted schematically in FIG. 2. Those skilled in the art will readily understand that image 34 may be any form of representation of surface 36, e.g., a photograph, a sonar or radar scan, etc.

Image 34 contains variations in background intensity 84. Therefore, subtask 82 of task 78 is followed by a subtask 86, which normalizes image 34 to equalize background intensity. Through subtask 86, the non-anomalous background of road surface 36 in image 34 has essentially even gray scale and contrast values throughout, causing anomalies 32 to stand out. The technique of image normalization is well known to those skilled in the art.

Once image 34 has been normalized, a subtask 88 masks non-anomalous features 76, e.g., traffic-control markings such as white and yellow lines, speed-limit numbers, etc. Through subtask 88, non-anomalous features 76 are given essentially the same gray scale and contrast values as the background of road surface 36. Therefore, non-anomalous features 76 will no longer be a part of image 34 and will not be confused by procedure 38 with anomalies 32. Image 34 of road surface 36 is thus converted into normalized and masked image 80 (FIG. 5).

Those skilled in the art will appreciate that the order of subtasks 86 and 88 is irrelevant, and that other orders and/or tasks may be used to perform the same functions and produce normalized and masked image 80.

Figure 6:
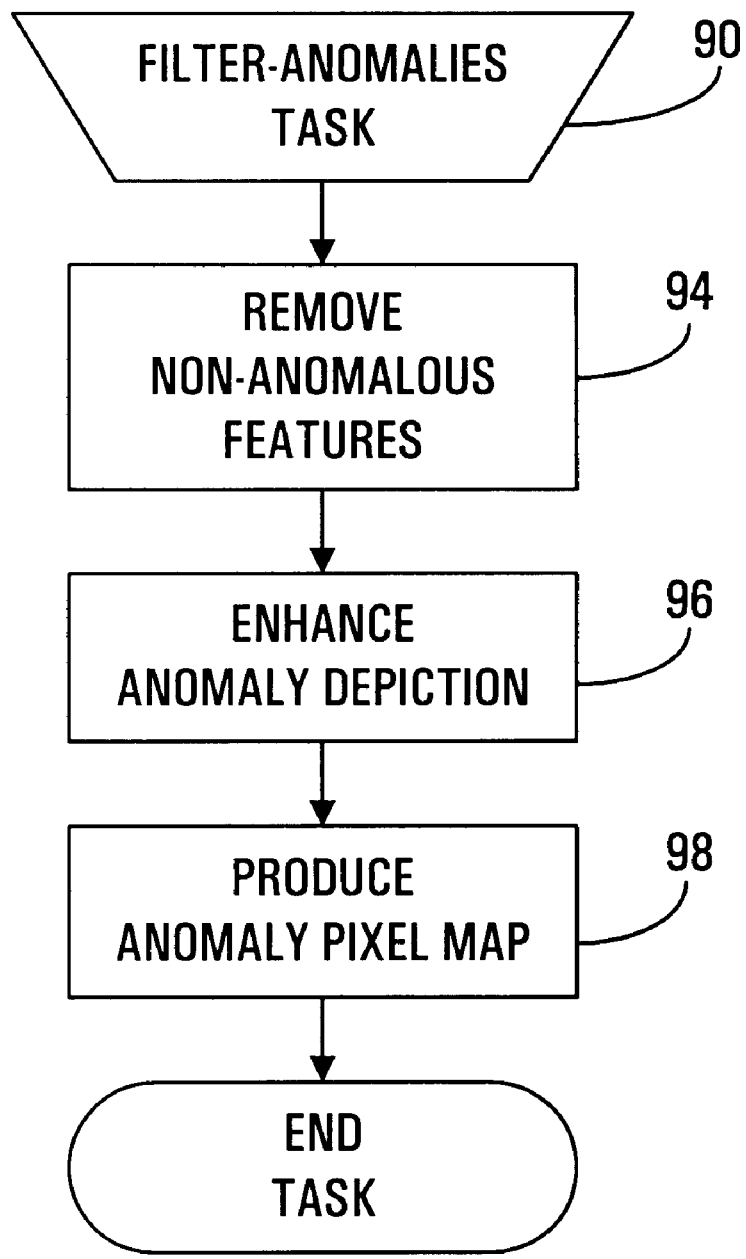
FIG. 6 depicts a flowchart of a task to filter anomalies in accordance with a preferred embodiment of the present invention.
Figure 7:
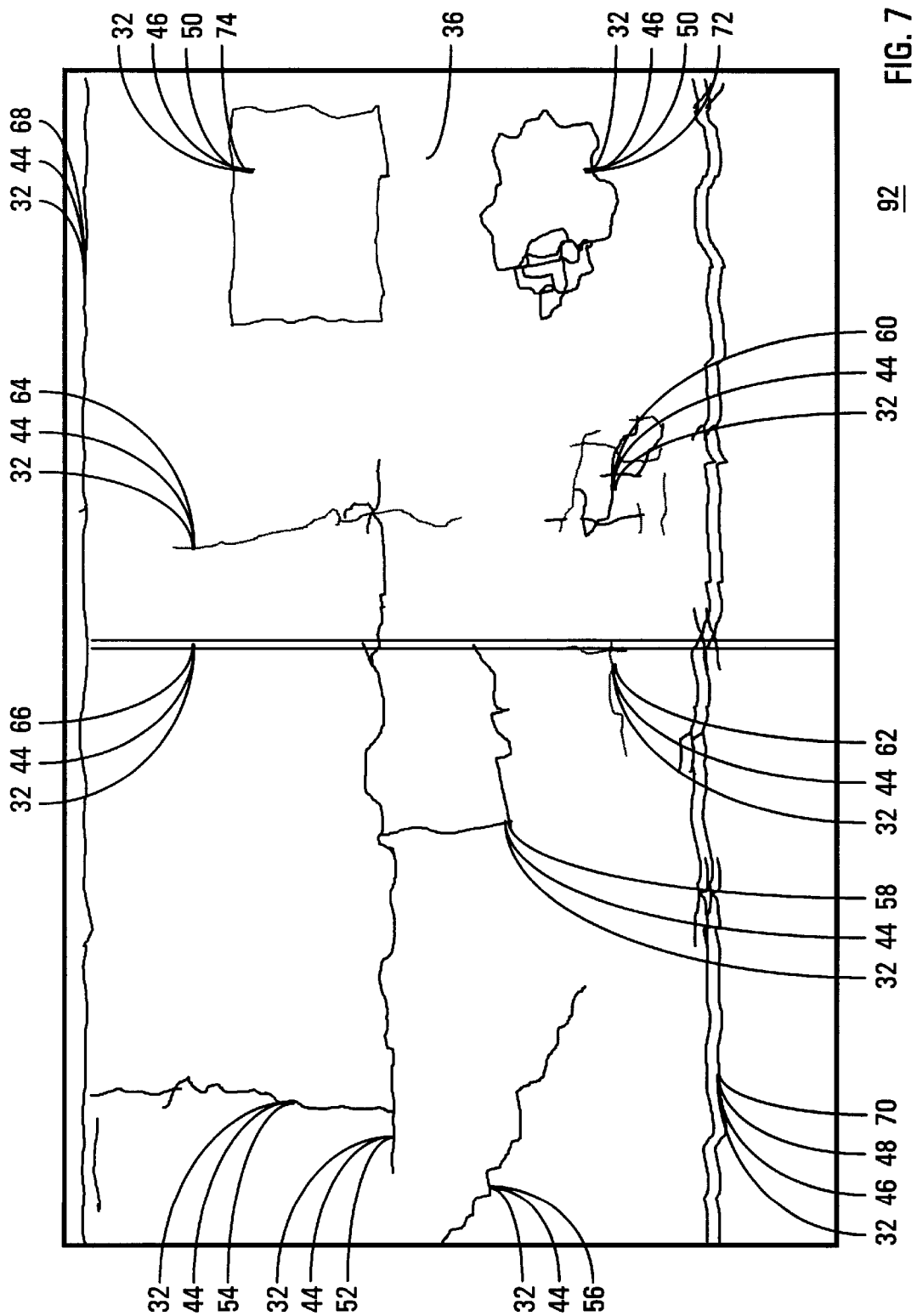
FIG. 7 depicts a line-anomaly pixel map of the road surface of FIG. 2 in accordance with a preferred embodiment of the present invention.

In accordance with a preferred embodiment of the present invention, FIG. 6 depicts a flowchart of a task 90 to filter anomalies 32. FIG. 7 depicts a line-anomaly pixel map 92 of road surface 36. The following discussion refers to FIGS. 3, 6, and 7.

Referring back to FIG. 3, task 78 is followed by tasks 90, filter line anomalies, 90', filter linear-area anomalies, and 90", filter block-area anomalies. Tasks 90, 90', and 90" are substantially identical save in the type of anomaly 32 to be filtered. Each of tasks 90, 90', and 90" is elaborated by the flowchart in FIG. 6.

While tasks 90, 90' and 90" are depicted as operating in parallel, those skilled in the art will appreciate that this is not a requirement, and that serial or other operations may be utilized to achieve the same results.

Utilizing filter-line-anomaly task 90 as an example, filter anomalies task 90 (FIG. 6) has a subtask 94 to remove non-anomalous features. Subtask 94 masks and removes from image 80 all features that are not discerned to be the specific anomalies 32 being filtered, i.e., line anomalies 44. Image feature masking and removal are techniques well known to those skilled in the art.

Following subtask 94, task 90 performs a subtask 96 to enhance anomaly depiction. Subtask 96 removes clutter and noise from image 80 so that the depiction of the specific anomalies 32 being filtered, i.e., line anomalies 44, is enhanced. Subtask 96 is essentially an image-cleaning task using conventional image-enhancement techniques known to those skilled in the art.

Those skilled in the art will appreciate that the order of subtasks 94 and 96 within task 90 is irrelevant. Other orders and/or subtasks may be used to accomplish the desired results.

Following subtasks 94 and 96, task 90 performs subtask 98 to produce a pixel map depicting the specific anomalies 32 being filtered. If line anomalies are being filtered, then line-anomaly pixel map 92 (FIG. 7) is produced.

In addition to line anomalies 44 delineated in Table 1 above, line-anomaly filter task 90 may also discern other fineline and transitional phenomena, such as the edges of area anomalies 46. Later processing in procedures 40 and 42 (FIG. 1) removes any potential ambiguity.

Figure 8:
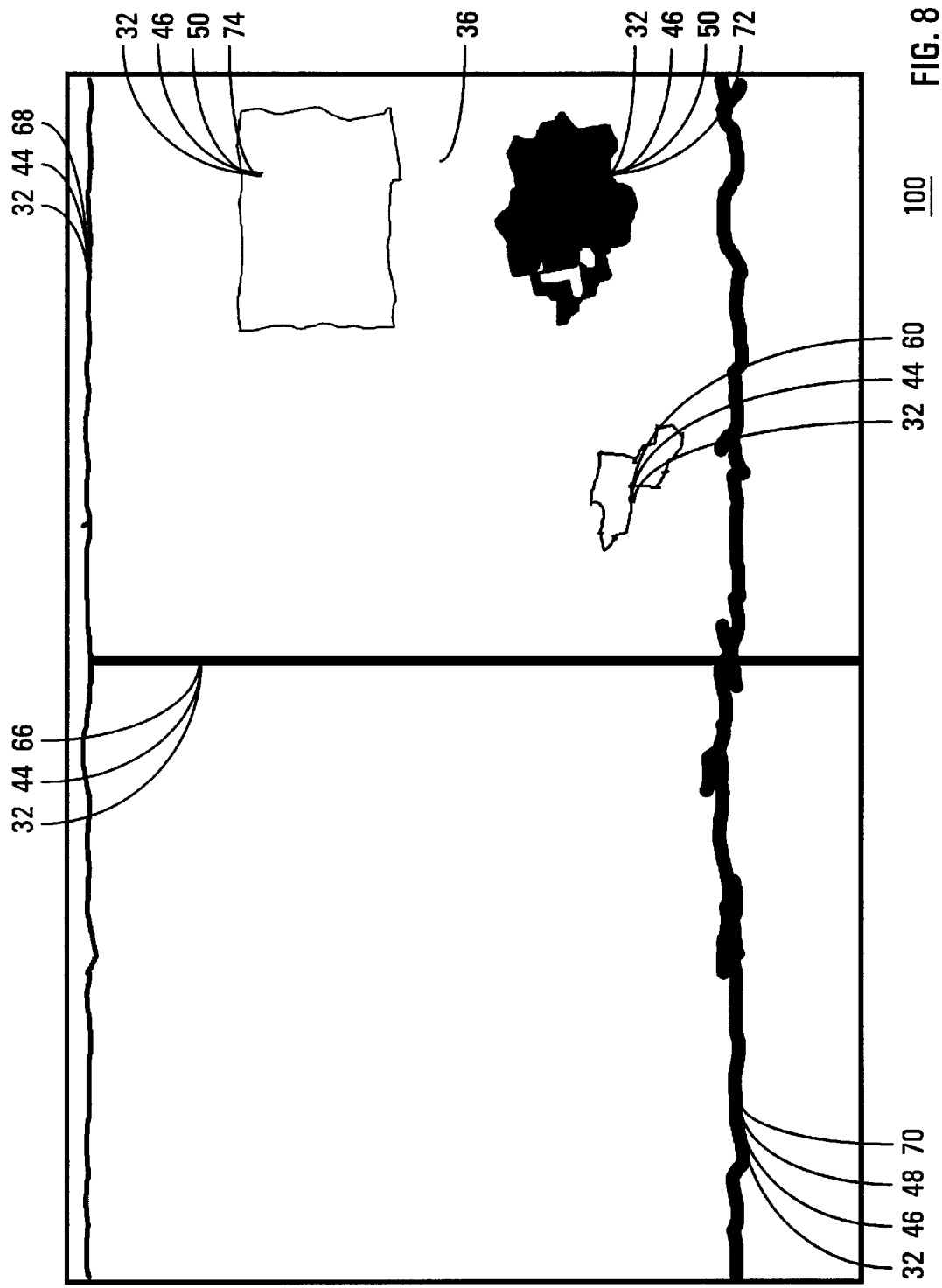
FIG. 8 depicts a linear-area-anomaly pixel map of the road surface of FIG. 2 in accordance with a preferred embodiment of the present invention.

In accordance with a preferred embodiment of the present invention, FIG. 8 depicts a linear-area-anomaly pixel 100 map of road surface 36. The following discussion refers to FIGS. 3, 6, and 8.

Task 90' (FIG. 3) filters linear-area anomalies 48 in a manner analogous to the way task 90 filters line anomalies 44, as described above. Subtask 94 (FIG. 6) masks and removes from image 80 all features that are not discerned to be linear-area anomalies 48. Subtask 96 then removes clutter and noise from image 80 so that the depiction of linear-area anomalies 48 is enhanced. Subtask 98 then produces linear-area-anomaly pixel map 100 (FIG. 8).

In addition to the anomalies delineated in Table 2 above, linear-area-anomaly filter task 90' may also discern other linear-area phenomena, such as surface edges 68, the edges of block-area anomalies 50, and, under certain conditions, surface joint anomalies 66. Later processing in procedures 40 and 42 (FIG. 1) removes any potential ambiguity.

Figure 9:
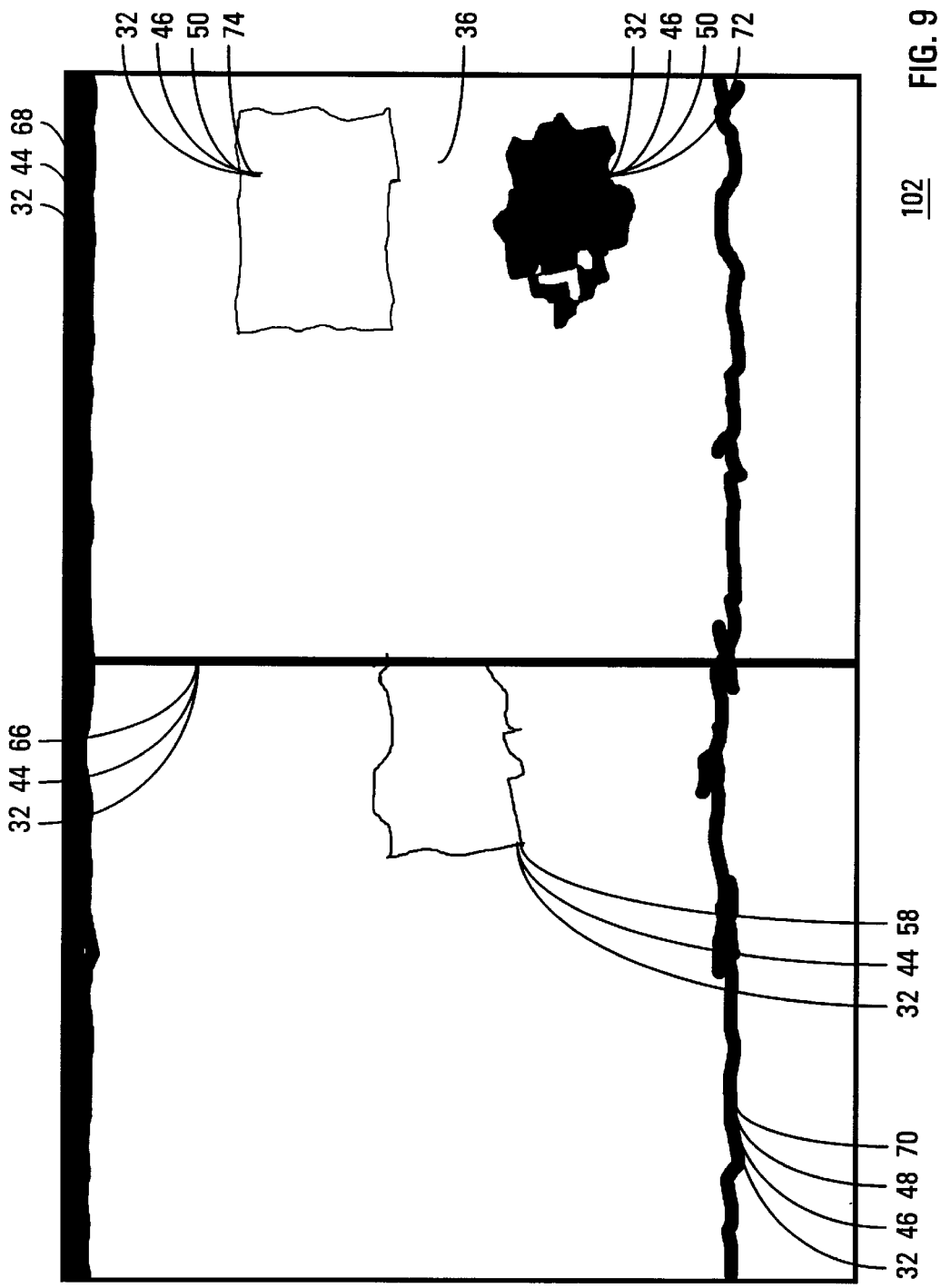
FIG. 9 depicts a block-area-anomaly pixel map of the road surface of FIG. 2 in accordance with a preferred embodiment of the present invention.

In accordance with a preferred embodiment of the present invention, FIG. 9 depicts a block-area-anomaly pixel map 102 of road surface 36. The following discussion refers to FIGS. 3, 6, and 9.

Again, task 90" (FIG. 3) filters block-area anomalies 50 in a like manner. Subtask 94 (FIG. 6) masks and removes from image 80 all features that are not discerned to be block-area anomalies 50. Subtask 96 then removes clutter and noise from image 80 so that the depiction of block-area anomalies 50 is enhanced. Subtask 98 then produces block-area-anomaly pixel map 102 (FIG. 9).

In addition to the anomalies delineated in Table 3 above, block-area-anomaly filter task 90" may also discern other area phenomena, such as surface edges 68, and, under certain conditions, surface joints 66 and dark block cracks 58. Later processing in procedures 40 and 42 (FIG. 1) removes any potential ambiguity.

Figure 10:
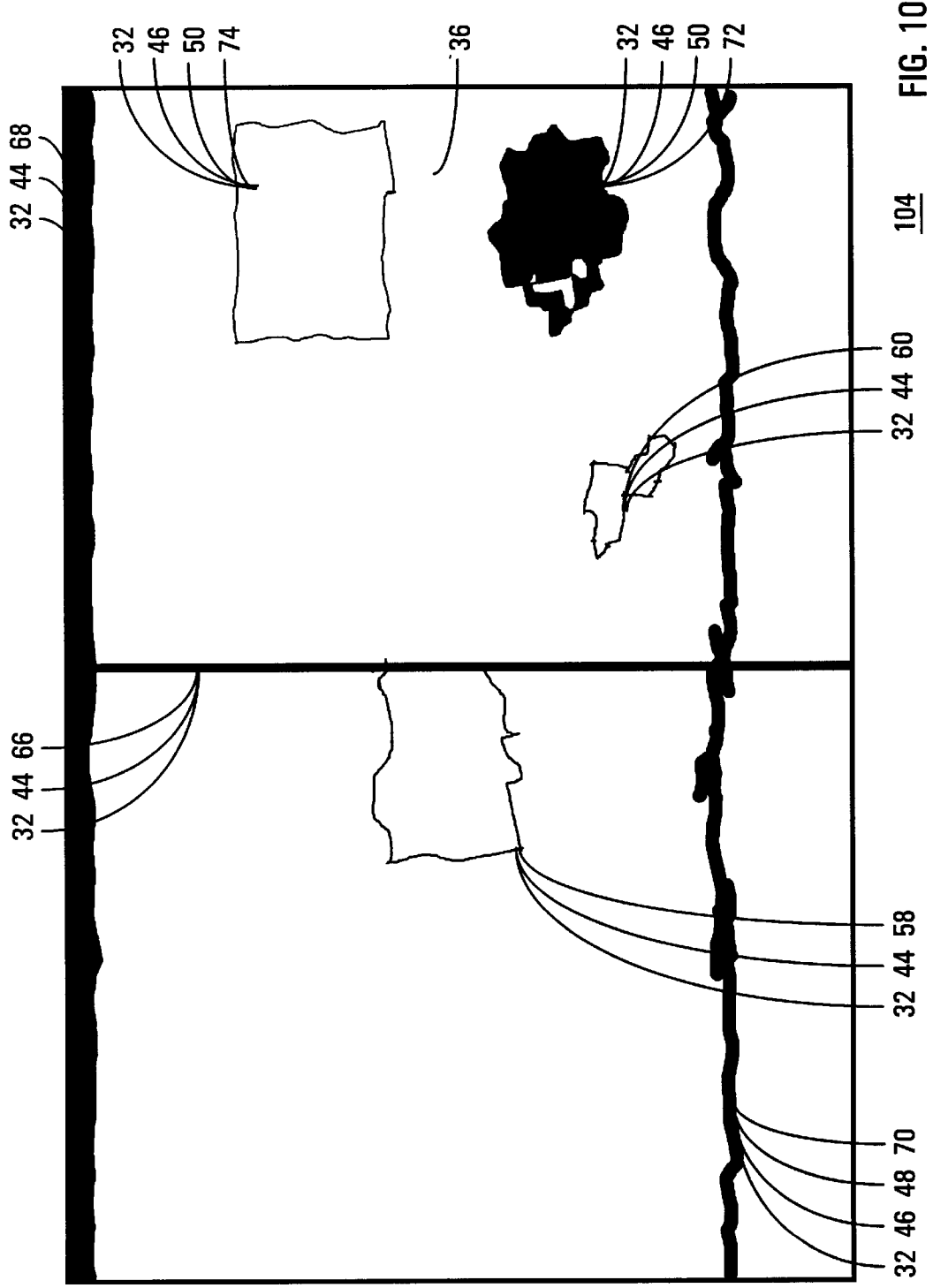
FIG. 10 depicts an area-anomaly pixel map of the road surface of FIG. 2 in accordance with a preferred embodiment of the present invention.

In accordance with a preferred embodiment of the present invention, FIG. 10 depicts an area-anomaly pixel map 104 of road surface 36. The following discussion refers to FIGS. 3, 6, and 10.

Following tasks 90' and 90" (FIG. 3), procedure 38 performs a task 106 combining linear-area-anomaly pixel map 100 (FIG. 8) and block-area-anomaly pixel map 102 (FIG. 9) to produce a combined-area-anomaly pixel map 104 (FIG. 10). Combined-area-anomaly pixel map 104, hereinafter referred to as area-anomaly pixel map 104, is substantially a pixel-by-pixel ORing of maps 100 and 102, and depicts all area anomalies (P2s) 50.

Those skilled in the art will realize that pixel maps 92, 100, 102, and 104 produced by tasks 90, 90', 90", and 106 need not be maps in the human-readable sense. They may be simply stored data within a computer system performing process 30. Any number of conventional mapping schemes are readily adaptable to the needs of process 30.

Referring to FIG. 1, anomaly-detection procedure 38 is now complete and control passes to subimage-processing procedure 40. The outputs of procedure 38, hence the inputs to procedure 40, are line-anomaly pixel map 92 (FIG. 7) and area-anomaly pixel map 104 (FIG. 10).

Figure 11:
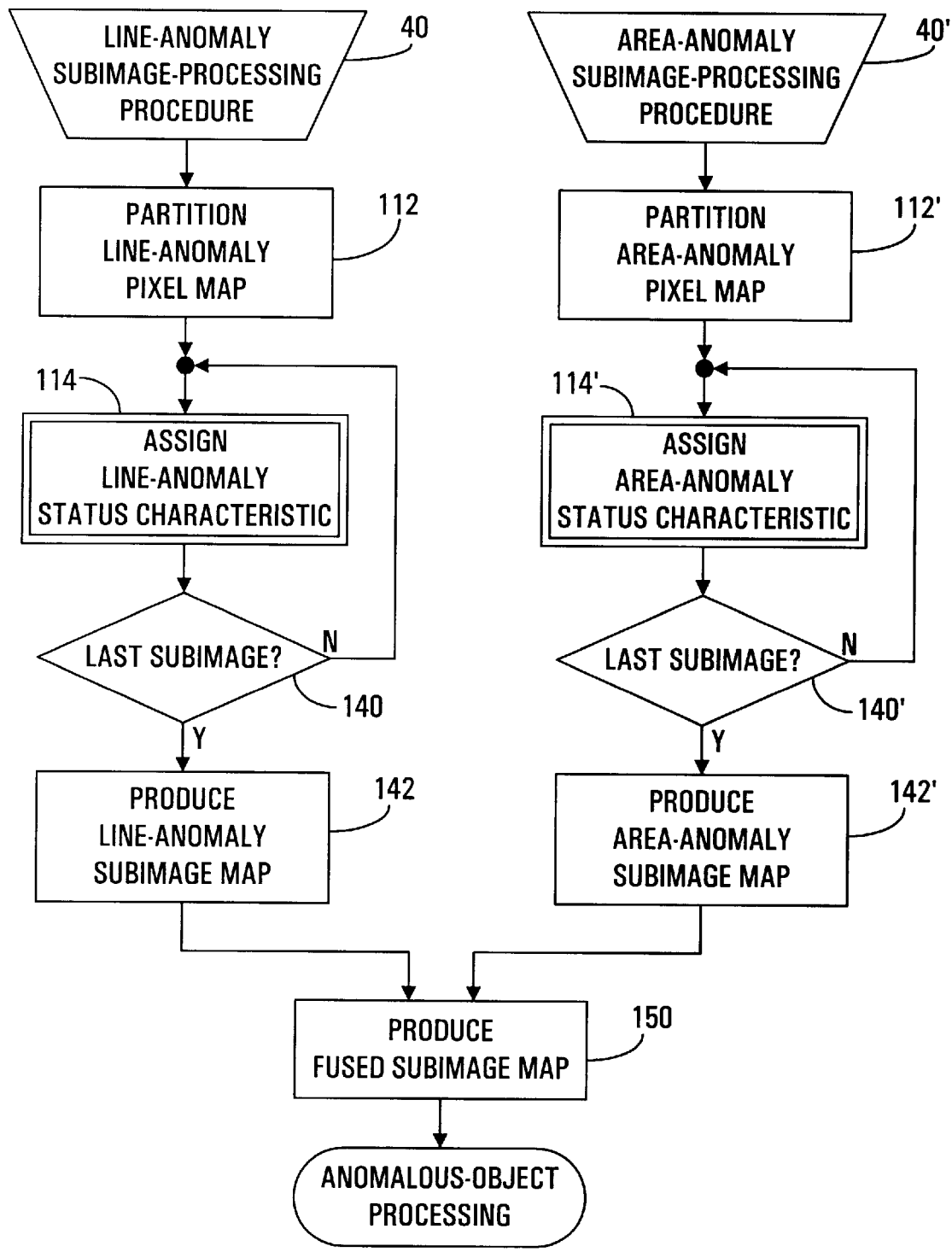
FIG. 11 depicts a flowchart of a procedure to process subimages in accordance with a preferred embodiment of the present invention.
Figure 12:
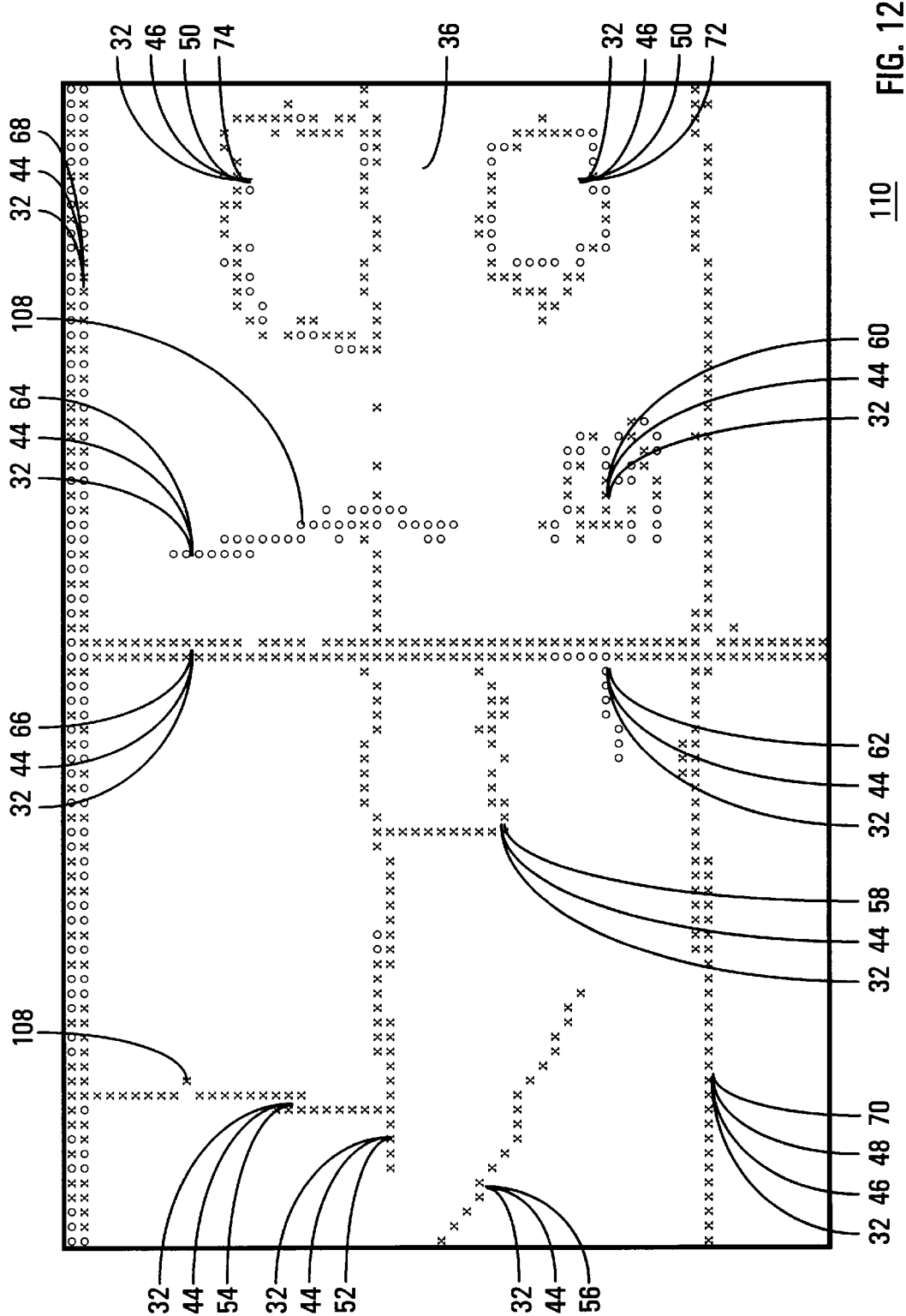
FIG. 12 depicts a subimage-partitioned line-anomaly pixel map of the road surface of FIG. 2 in accordance with a preferred embodiment of the present invention.

In accordance with a preferred embodiment of the present invention, FIG. 11 depicts a flowchart of a procedure 40 to process subimages 108, and FIG. 12 depicts a subimage-partitioned line-anomaly pixel map 110 of road surface 36. The following discussion refers to FIGS. 7, 11, and 12.

Procedure 40 is, in effect, a line-anomaly subimage processing procedure 40 and an area-anomaly subimage processing procedure 40'. Since procedures 40' and 40" are substantially identical, save in the type of subimage 108 to be processed, the following discussion of procedure 40' shall stand for procedure 40" as well.

Procedure 40 begins with a task 112 to partition line-anomaly pixel map 92 (FIG. 7) into subimages 108 and produce subimage-partitioned line-anomaly pixel map 110.

In a typical example of the preferred embodiment, each pixel in image 34 (FIG.2) and in all images and pixel maps derived from image 34, including line-anomaly pixel map 92, represents an area of road surface 36 that is 1 by 1 millimeters (i.e., 1 mm$^2$). Task 112 partitions line-anomaly pixel map 92 into a multiplicity of subimages 108, each of which contains a plurality of pixels. In this example, each subimage 108 is 64 by 64 pixels (4096 mm$^2$), with map 110 having an overall size of 60 by 90 subimages 108 (3480 by 5760 millimeters, or 22.1184 m$^2$).

Those skilled in the art will appreciate that there is no requirement as to the amount of surface 36 represented by each pixel, the number of pixels per subimage 108, or the number of subimages 108 per map. Indeed, when surface 36 is other than road surface 36, the requirements of scale may well necessitate differing values. A change in scale does not depart from the spirit or intent of the present invention.

Those skilled in the art will appreciate that subimage-partitioned pixel map 110 (and other subimage-partitioned pixel maps to be discussed in turn) need not be maps in the human-readable sense. It will further be appreciated that all subimages 108 derived from line-anomaly pixel map 92 (FIG. 7) are contained in subimage-partitioned line-anomaly pixel map 110, though only those subimages 108 containing at least one anomaly 32 are depicted. Line-anomaly subimages 108 are depicted as either an "x" or an "o" depending upon whether line-anomaly 44 contained therein is dark or light.

Figure 13:
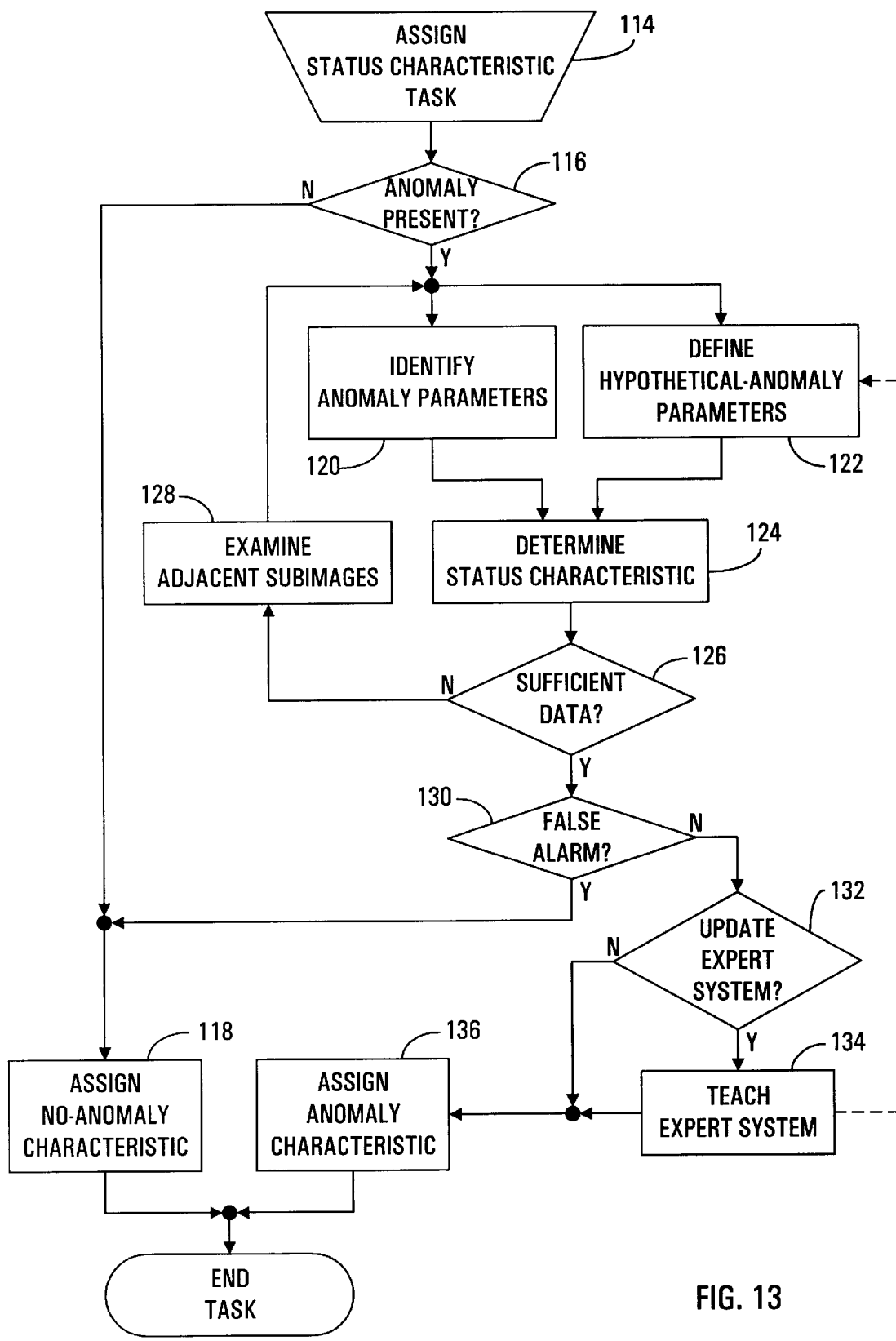
FIG. 13 depicts a flowchart of a task to assign subimage status characteristics in accordance with a preferred embodiment of the present invention.

In accordance with a preferred embodiment of the present invention, FIG. 13 depicts a flowchart of a task 114 to assign subimage status characteristics. The following discussion refers to FIGS. 11, 12, and 13.

Line-anomaly subimage-processing procedure 40 executes a task 114 to assign line-anomaly status characteristics to each subimage 108 in subimage-partitioned line-anomaly pixel map 110. This may be accomplished by pointing to a first subimage 108 of map 110 then executing task 114. Task 114 is expanded in FIG. 13.

Task 114 executes a decision subtask 116 to determine if anomalies 32 are present in a preponderance of the pixels within subimage 108.

If anomalies 32 are not present in a preponderance of the pixels in subimage 108, then subimage 108 is said to not contain any anomaly 32. Task 114 then executes a subtask 118 to assign a no-anomaly status characteristic (not shown) to subimage 108. Task 114 is then complete.

If anomalies 32 are present in a preponderance of the pixels in subimage 108, then subimage 108 is said to contain that specific anomaly 32 that is a majority of anomalies 32 present. Task 114 then executes a subtask 120 to identify parameters of that specific anomaly 32.

In a subtask 122, task 114 defines parameters of hypothetical anomalies previously determined by an expert system.

Subtasks 120 and 122 are depicted as executing in parallel. Those skilled in the art will appreciate that tasks 120 and 122 may be executed in serial, and/or that other subtasks may be performed to achieve the same ends.

The status characteristic for subimage 108 is determined in a subtask 124 by comparing the parameters of the specific anomaly 32 contained in subimage 108 against the parameters of the hypothetical anomalies.

Subtask 124 is followed by a decision subtask 126 wherein task 114 determines if subtask 124 had sufficient data to determine the status characteristic of subimage 108.

If decision subtask 126 determines that there was insufficient data to determine the status characteristic for subimage 108, then a subtask 128 is executed to examine adjacent subimages 108 and increase the size of the data pool for the specific subimage 108. Control is then routed back to subtask 120 and another attempt is made to determine a status characteristic for subimage 108.

If a status characteristic was determined for subimage 108, or a status characteristic was not determined but adjacent subimages 108 have already been considered, then task 114 executes a decision subtask 130 to determine if status assignment is a false alarm. Status characteristic assignment is considered a false alarm if no status characteristic could be assigned, or if the only status characteristic that could be assigned is not a status characteristic of the specific anomaly 32 under consideration, i.e., is not a line-anomaly status characteristic when line anomalies 44 are being considered or an area-anomaly status characteristic when area anomalies 46 are being considered.

If a false alarm exists, then subtask 118 assigns a no-anomaly status characteristic to subimage 108 and task 114 is complete.

If a false alarm does not exist, then task 114 executes a decision task 132 to determine if the parameters of subimage 108 are currently among the parameters of the hypothetical anomalies.

If the parameters of subimage 108 are not among those of the hypothetical anomalies, then a subtask 134 teaches the expert system maintaining the hypothetical-anomaly parameters the parameters of subimage 108 and the listings of hypothetical-anomaly parameters are updated. In this manner, process 30, through procedure 40 and task 114, is continuously updated with new data as required.

Next, a subtask 136 assigns the status characteristic of the specific anomaly to subimage 108. Task 114 is then complete.

Figure 14:
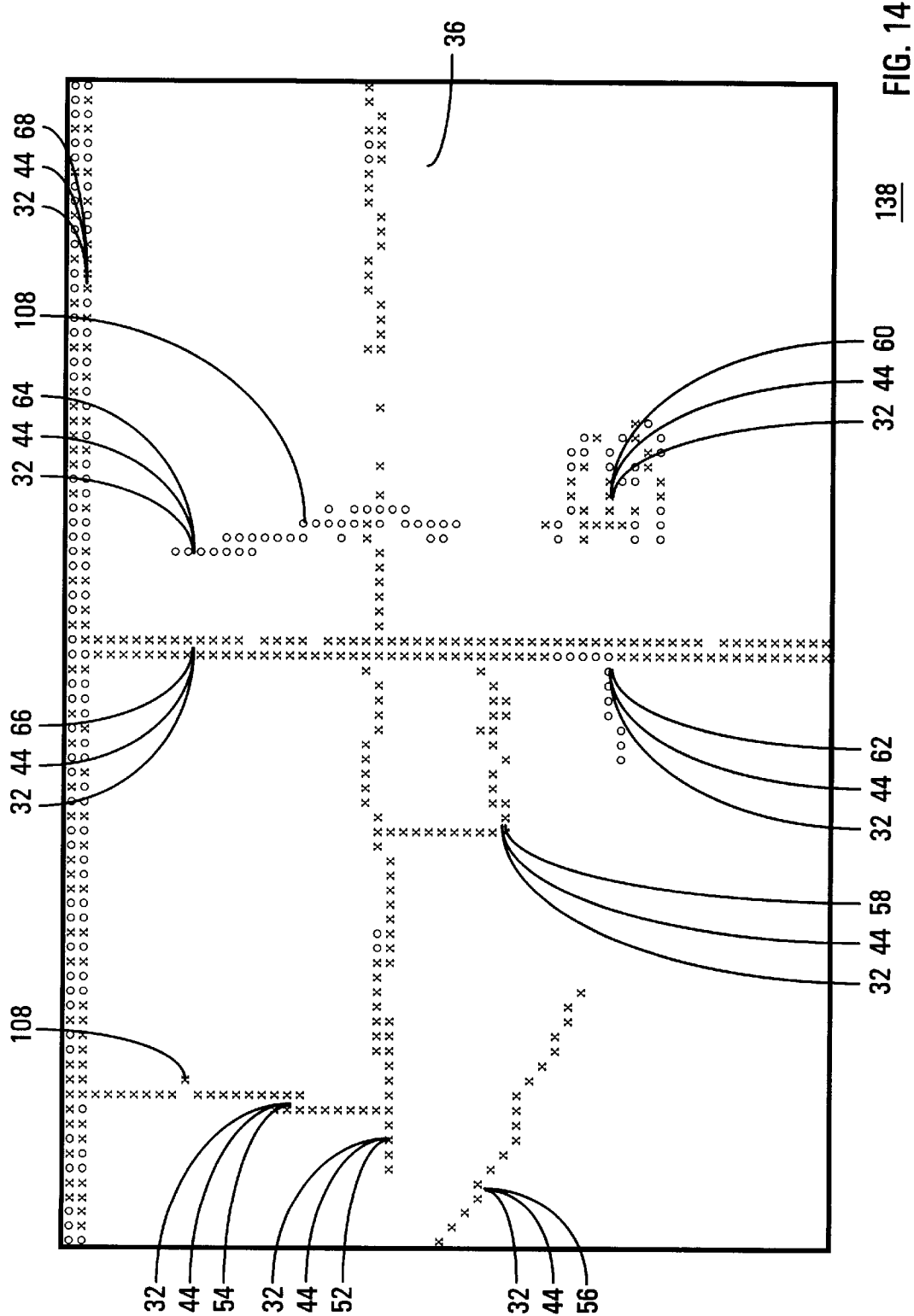
FIG. 14 depicts a line-anomaly subimage map of the road surface of FIG. 2 in accordance with a preferred embodiment of the present invention.

In accordance with a preferred embodiment of the present invention, FIG. 14 depicts a line-anomaly subimage map 138 of road surface 36. The following discussion refers to FIGS. 11 and 14.

Referring back to FIG. 11, task 114 is followed by a decision task 140 to determine if the just-processed subimage 108 is the last subimage 108 in subimage-partitioned line-anomaly pixel map 110.

If the just-processed subimage 108 is not the last subimage 108, then procedure 40 points to the next subimage 108 and jumps back to task 114.

If the just-processed subimage 108 is the last subimage 108, then procedure 40 proceeds to a task 142. Task 142 produces line-anomaly subimage map 138 (FIG. 14).

Those skilled in the art will realize that the resultant subimage map need not be a map in the physical sense, but may be a collection of data within a computer system executing process 30.

Figure 15:
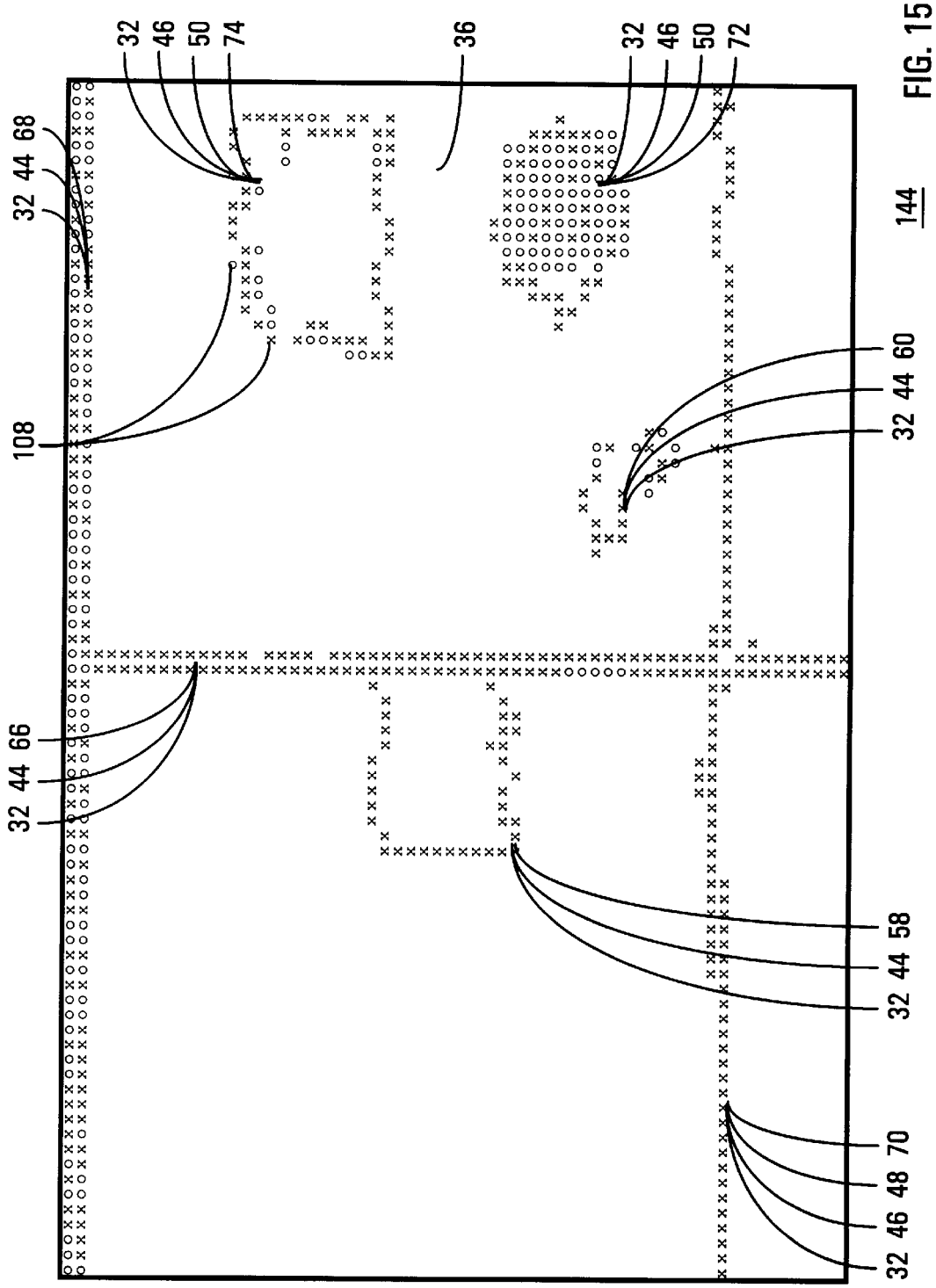
FIG. 15 depicts a subimage-partitioned area-anomaly pixel map of the road surface of FIG. 2 in accordance with a preferred embodiment of the present invention.
Figure 16:
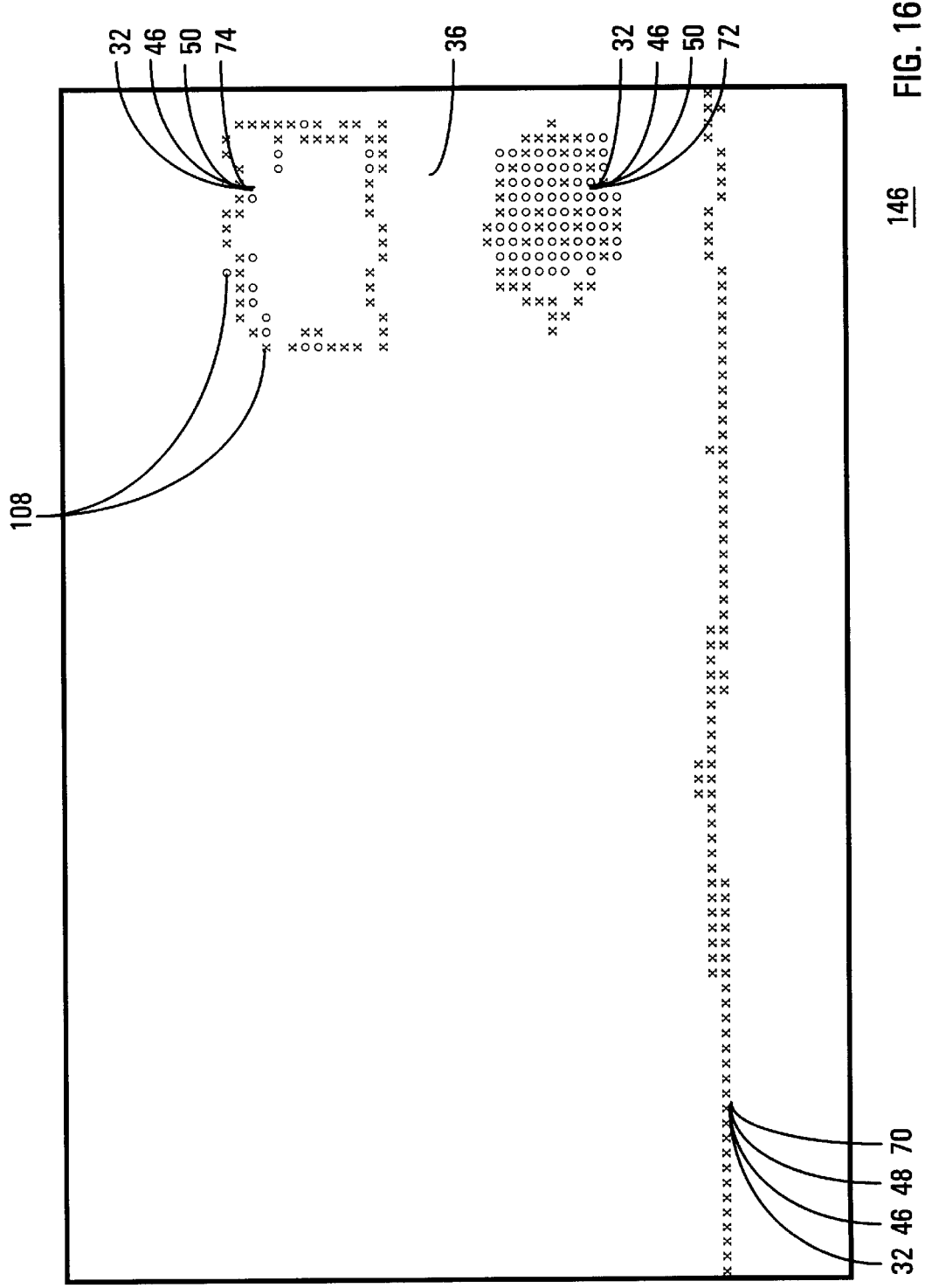
FIG. 16 depicts an area-anomaly subimage map of the road surface of FIG. 2 in accordance with a preferred embodiment of the present invention.

In accordance with a preferred embodiment of the present invention, FIG. 15 depicts a subimage-partitioned area-anomaly pixel map 144 of road surface 36, and FIG. 16 depicts an area-anomaly subimage map 146 of road surface 36. The following discussion refers to FIGS. 11, 15, and 16.

Referring back to FIG. 11, area-anomaly subimage-processing procedure 40' produces area-anomaly subimage map 146 in a manner completely analogous to procedure 40.

Procedure 40' begins with a task 112' to partition area-anomaly pixel map 104 (FIG. 10) into subimages 108 and produce subimage-partitioned area-anomaly pixel map 144.

Procedure 40' then executes a task 114' to assign area-anomaly status characteristics to each subimage 108 in subimage-partitioned area-anomaly pixel map 144 (FIG. 15) and produce area-anomaly subimage map 146 (FIG. 16). Task 114' functions in a manner analogous to task 114, described above.

Task 114' is followed by a decision task 140' to determine if the just-processed subimage 108 is the last subimage 108 in subimage-partitioned area-anomaly pixel map 144.

If the just-processed subimage 108 is not the last subimage 108, then procedure 40' points to the next subimage 108 and jumps back to task 114'.

If the just-processed subimage 108 is the last subimage 108, then procedure 40' proceeds to a task 142'. Task 142' produces area-anomaly subimage map 146 (FIG. 16).

While procedures 40 and 40' are depicted as operating in parallel, those skilled in the art will appreciate that this is not a requirement, and that serial or other operations may be utilized to achieve the same results.

Figure 17:
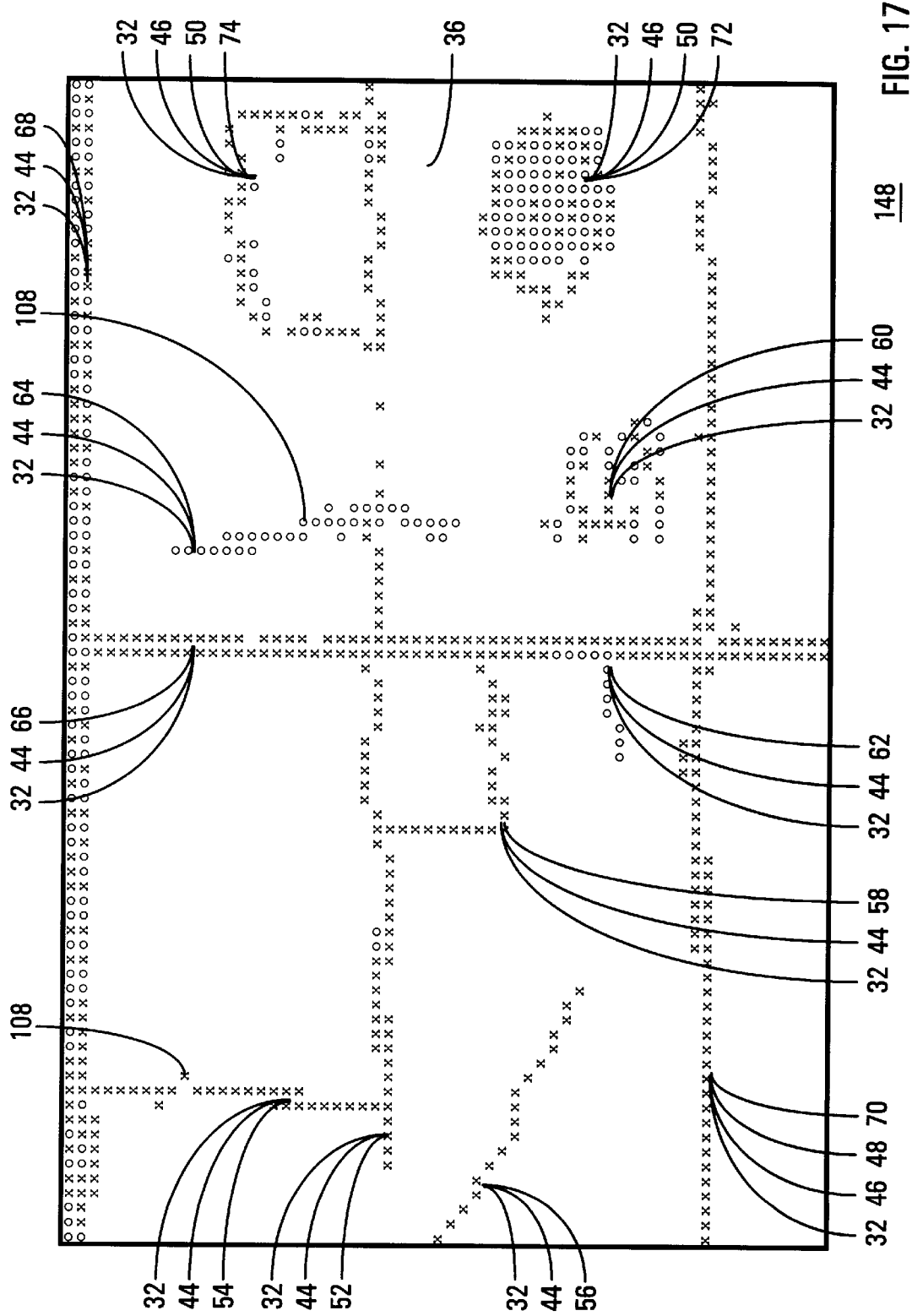
FIG. 17 depicts an anomaly subimage map of the road surface of FIG. 2 in accordance with a preferred embodiment of the present invention.

In accordance with a preferred embodiment of the present invention, FIG. 17 depicts an anomaly subimage map 148 of road surface 36. The following discussion refers to FIGS. 1, 11, 14, 16, and 17.

Referring back to FIG. 11, in a task 150, procedure 40 fuses line-anomaly subimage map 138 produced by task 142 and area-anomaly subimage map 146 produced by task 142' into fused anomaly subimage map 148. Those skilled in the art will realize that anomaly subimage map 138 need not be a map in the physical sense, but may be a collection of data within a computer system executing process 30.

Subimage-processing procedure 40 (FIG. 1) is now complete, and anomaly subimage map 148 becomes the input to object-processing procedure 42.

Figure 18:
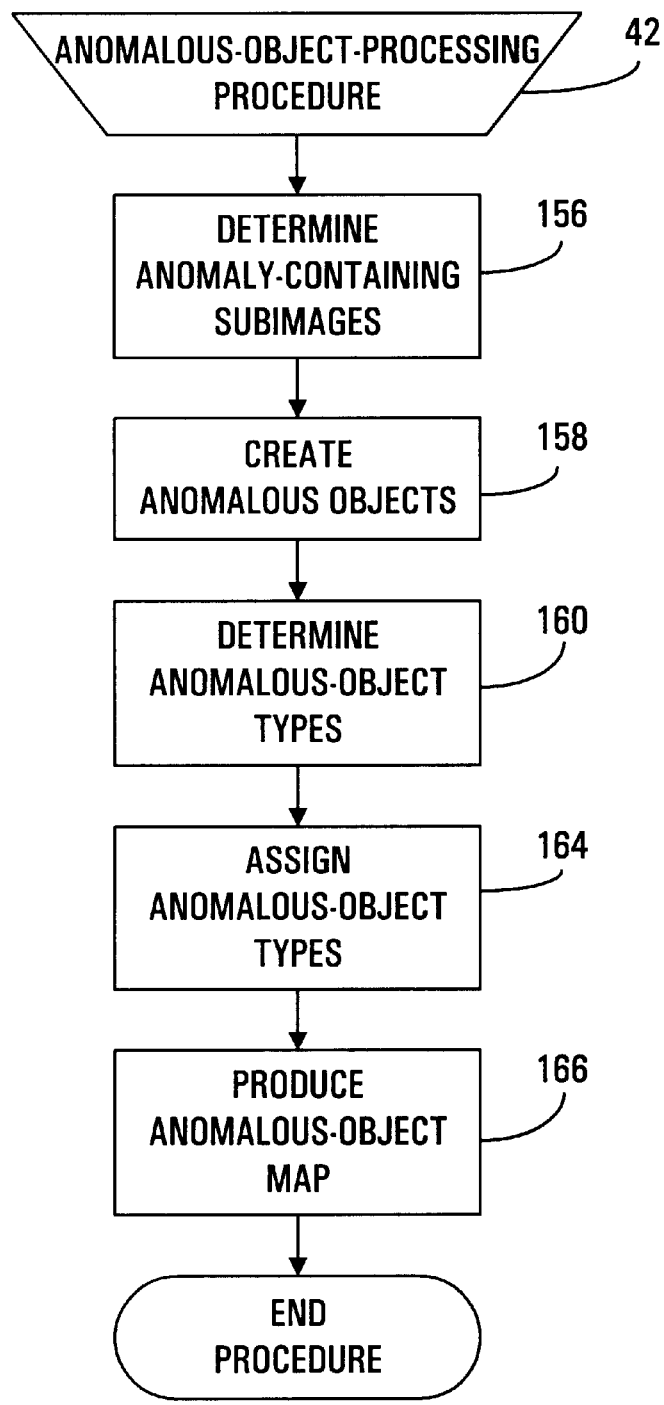
FIG. 18 depicts a flowchart of a procedure to process anomalous objects in accordance with a preferred embodiment of the present invention.
Figure 19:
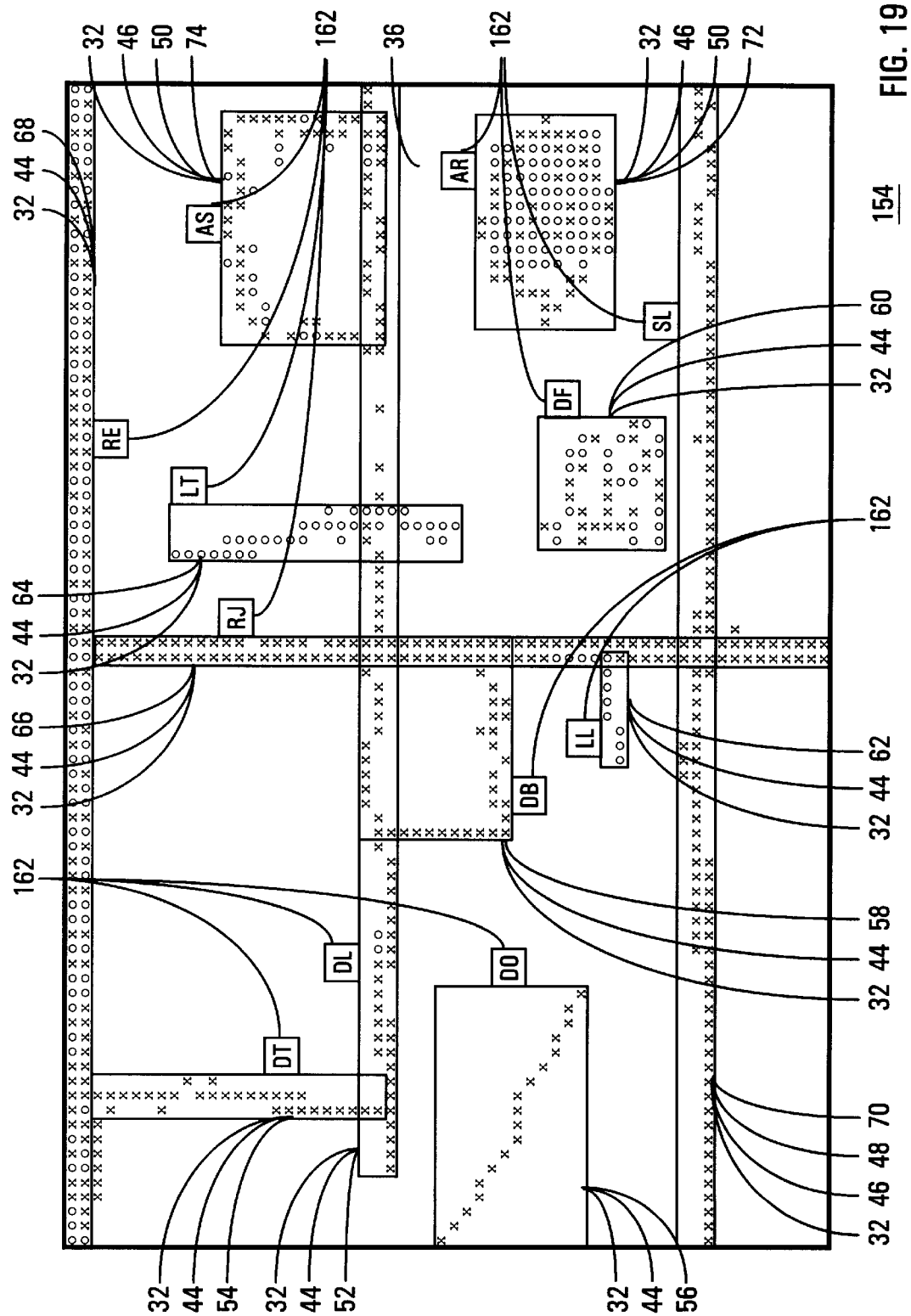
FIG. 19 depicts an anomalous-object map of the road surface of FIG. 2 in accordance with a preferred embodiment of the present invention.

In accordance with a preferred embodiment of the present invention, FIG. 18 depicts a flowchart of procedure 42 to process anomalous objects 152. FIG. 19 depicts an anomalous-object map 154 of road surface 36. The following discussion refers to FIGS. 1, 17, 18, and 19.

In process 30 (FIG. 1), procedure 40 is followed by procedure 42 to process anomalous objects. Procedure 42 is elaborated in FIG. 18.

Procedure 42 begins with a task 156 wherein anomaly subimage map 148 (FIG. 17) produced by subimage-processing procedure 40 is examined to determine which subimages 108 contain anomalies 32, i.e., which subimages 108 have an anomaly status characteristic.

A task 158 then groups subimages 108 with like characteristics into anomalous objects 152 by aligning and matching subimage status characteristics.

A task 160 then determines a type 162 of each anomalous object 152. Anomalous objects 152 and their types 162 are delineated in Table 4 below and are depicted in anomalous-object map 154 (FIG. 19).

TABLE 4

Anomaly Types

| ANOMALY | TYPE | REF. NO. |
| --- | --- | --- |
| dark longitudinal crack | DL | 51 |
| dark transverse crack | DT | 54 |
| dark oblique crack | DO | 56 |
| dark block crack | DB | 58 |
| dark fatigue crack | DF | 60 |
| light longitudinal crack | LL | 62 |
| light transverse crack | LT | 64 |
| light oblique crack | LO | not shown |
| light block qrack | LB | not shown |
| light fatigue crack | LF | not shown |
| longitudinal road joint | JL | not shown |
| transverse road joint | JT | 66 |
| oblique road joint | JO | not shown |
| longitudinal road edge | EL | 68 |
| transverse road edge | ET | not shown |
| oblique road edge | EO | not shown |
| longitudinal sealed crack | SL | 70 |
| transverse sealed crack | ST | not shown |
| oblique sealed crack | SO | not shown |
| block sealed crack | SB | not shown |
| fatigue sealed crack | SF | not shown |
| pothole (rough area) | AR | 72 |
| patch (smooth area) | AS | 74 |

Following task 160, procedure 42 executes task 164 and assigns anomalous-object types 162 to the corresponding anomalous objects 152.

A task 166 then produces anomalous-object map 154, which is the output of process 30 (FIG. 1). Each anomalous object 152 in anomalous-object map 154 correlates directly with an anomaly 32 in normalized and masked image 80 (FIG. 5) of road surface 36.

Those skilled in the art will appreciate that the above-described preferred embodiment of process 30 is but one of a plurality of alternative embodiments by which process 30 may be executed. One such alternative embodiment is described below. The following discussion refers to FIGS. 1 and 2.

In the alternative embodiment, process 30 (FIG. 1) includes anomaly-detection procedure 38, subimage-processing procedure 40, and anomalous-object-processing procedure 42.

Image 34 (FIG. 2) schematically depicts a section of road surface 36 having a plurality of anomalies 32. Anomalies 32 may be fineline or transitional phenomena (line anomalies 44), wideline phenomena (linear-area anomalies 48), or area phenomena (block-area anomalies 50). Additionally, image 34 depicts a plurality of non-anomalous features 76 of road surface 36.

Figure 20:
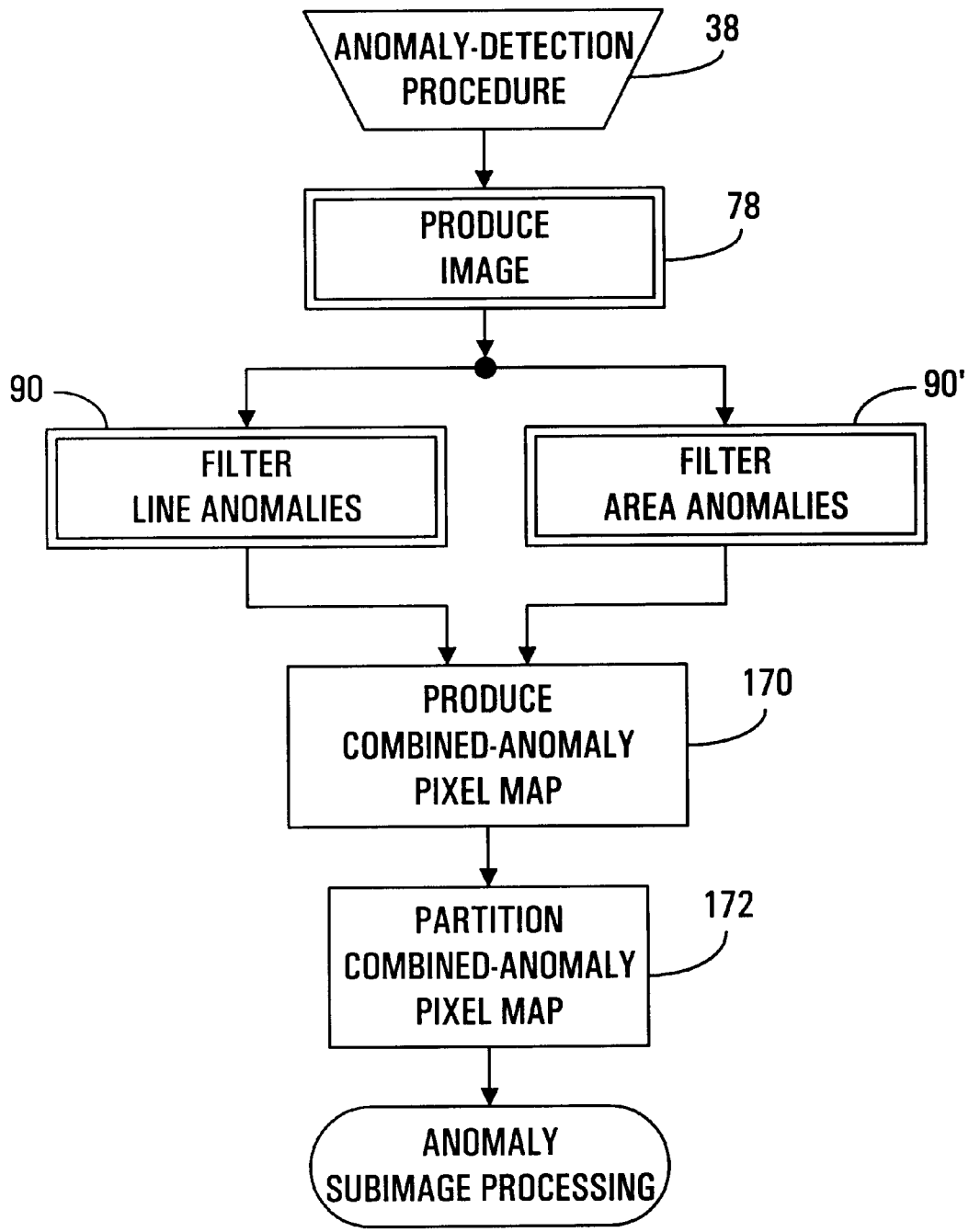
FIG. 20 depicts a flowchart of an alternative anomaly-detection procedure, this procedure detecting line and area anomalies in accordance with a preferred embodiment of the present invention.
Figure 21:
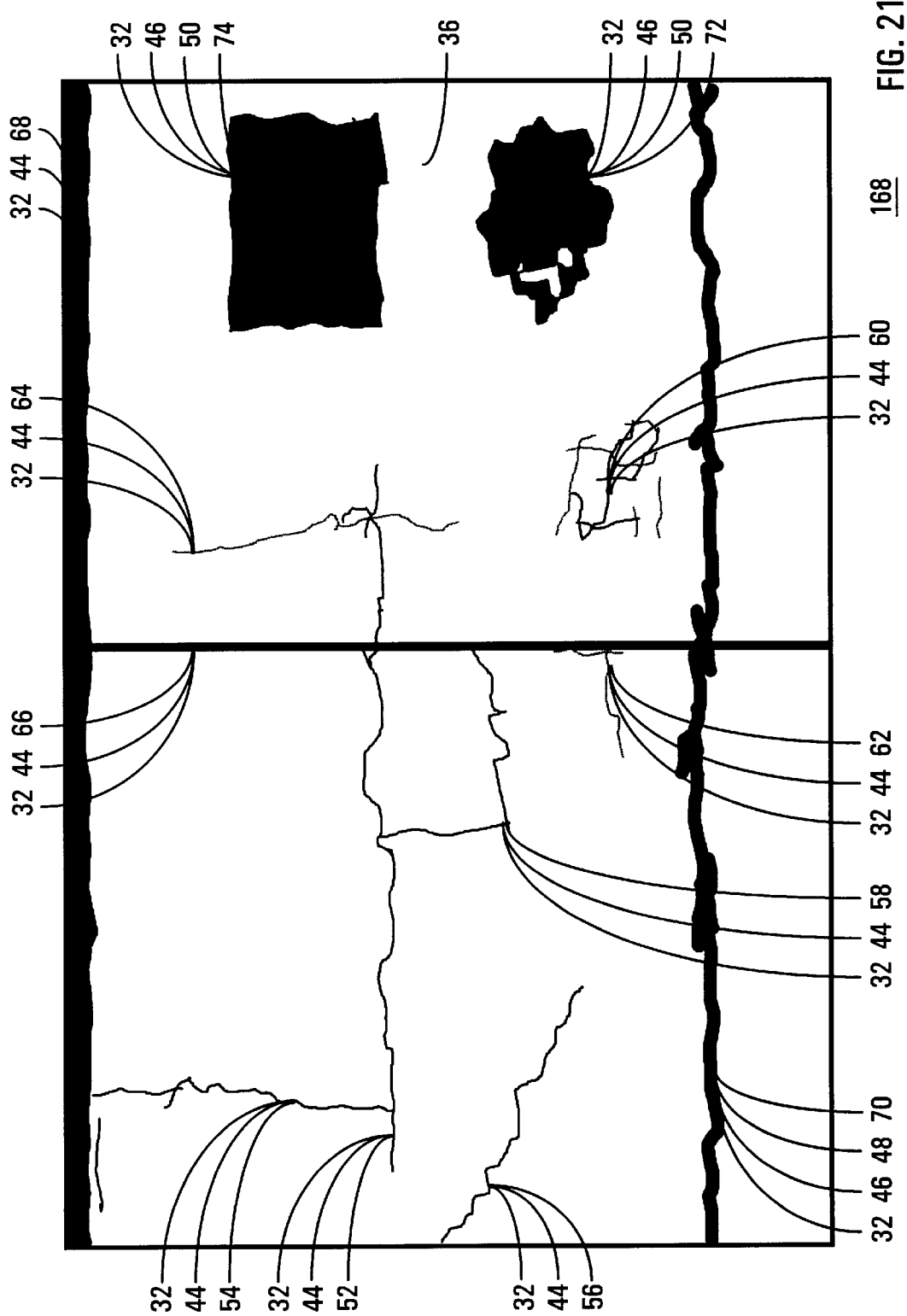
FIG. 21 depicts an anomaly pixel map of the road surface of FIG. 2 in accordance with a preferred embodiment of the present invention.

In accordance with an alternative embodiment of the present invention, FIG. 20 depicts a flowchart of an alternative anomaly-detection procedure 38, and FIG. 21 depicts an anomaly pixel map 168 of road surface 36. The following discussion refers to FIGS. 1, 2, 5, 7, 10, 20, and 21.

In the alternative embodiment, process 30 (FIG. 1) begins with anomaly-detection procedure 38, which is diagrammed in FIG. 20. Anomaly-detection procedure 38 has a task 78. Through subtasks described above, task 78 produces image 34 of road surface 36 (FIG. 2), normalizes image 34, masks non-anomalous features 76 of image 34, and converts image 34 into normalized and masked image 80 (FIG. 5) of road surface 36.

Task 78 is followed in procedure 38 by task 90 to filter line anomalies and task 90' to filter area anomalies. Tasks 90 and 90' are substantially identical, save in the type of anomaly 32 to be filtered.

While tasks 90 and 90' are depicted as operating in parallel, those skilled in the art will appreciate that this is not a requirement, and that serial or other operations may be utilized to achieve the same results.

Several subtasks (described above) within filter-line-anomaly task 90 mask and remove from image 80 all features that are not line anomalies 44, remove clutter and noise from image 80 so that the depiction of line anomalies 44 is enhanced, and produce line-anomaly pixel map 92 (FIG. 7).

Similarly, several subtasks (described above) within filter-area-anomaly task 90' mask and remove from image 80 all features that are not area anomalies 46, remove clutter and noise from image 80 so that the depiction of area anomalies 46 is enhanced, and produce area-anomaly pixel map 104 (FIG. 10).

Following tasks 90 and 90', a task 170 then combines line-anomaly pixel map 92 and area-anomaly pixel map 104 to produce combined-anomaly pixel map 168 (FIG. 21), hereinafter referred to as anomaly pixel map 168.

A task 172 then partitions anomaly pixel map 168 into subimages 108. Partitioned anomaly pixel map 168 is then passed to anomaly-subimage-processing procedure 40.

Anomaly-detection procedure 38 (FIG. 20) is now complete and control passes to subimage-processing procedure 40 (FIG. 1). The output of procedure 38, hence the inputs to procedure 40, are anomaly pixel map 168 (FIG. 21).

Figure 22:
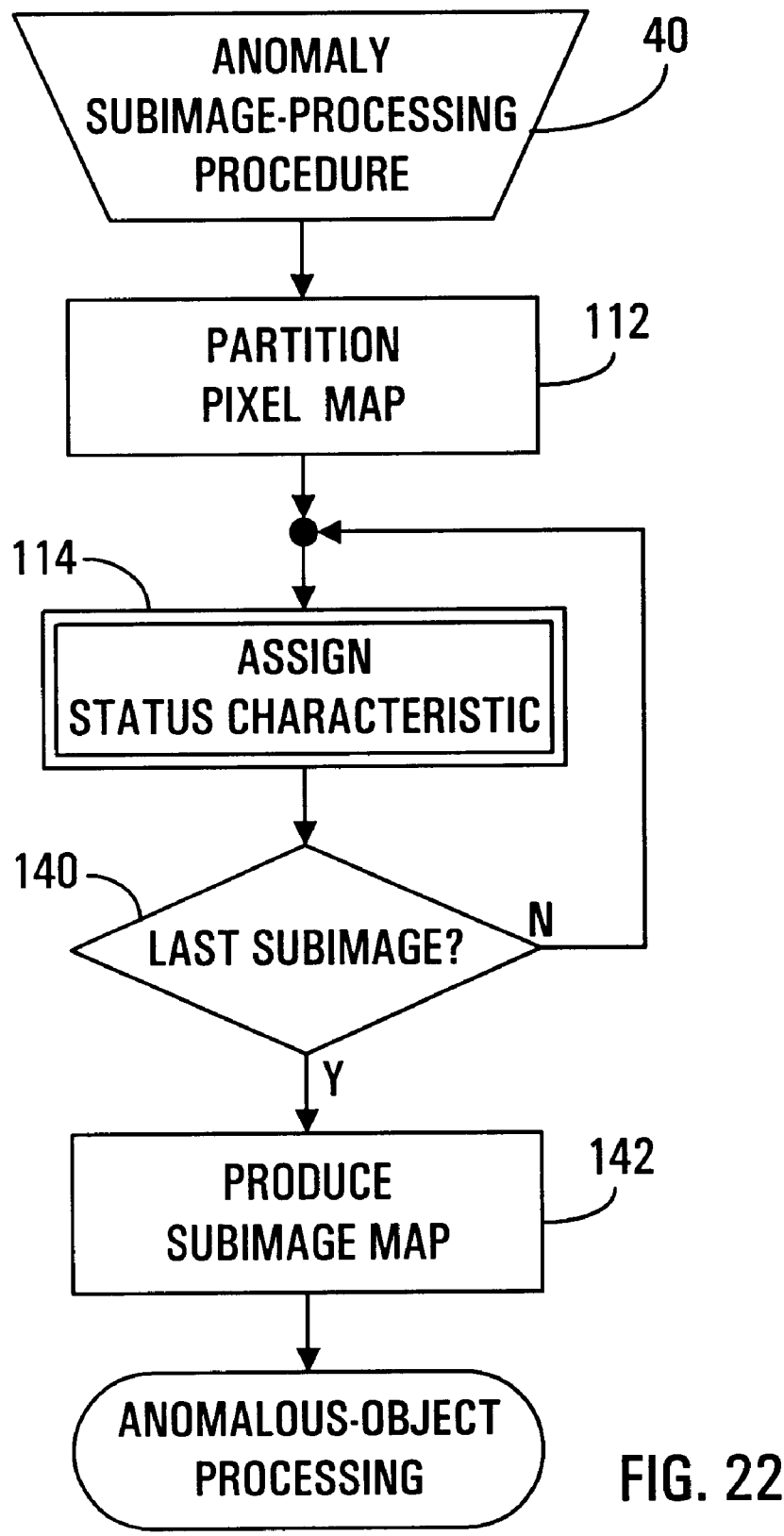
FIG. 22 depicts a flowchart of a procedure to process subimages in accordance with an alternative embodiment of the present invention.

In accordance with an alternative embodiment of the present invention, FIG. 22 depicts a flowchart of a procedure 40 to process subimages 108. The following discussion refers to FIGS. 1, 17, 21, and 22.

In the alternative embodiment, line-anomaly subimage-processing procedure 40 (FIG. 22) begins with a task 112 to partition anomaly pixel map 168 (FIG. 21) into subimages 108 and produce subimage-partitioned anomaly pixel map (not shown, but visually indistinguishable from anomaly subimage map 148 (FIG. 17)).

Procedure 40 then executes a task 114 to assign anomaly status characteristics to each subimage 108 in subimage-partitioned anomaly pixel map 110. This is accomplished in a manner described in detail above.

Task 114 is followed by a decision task 140 to determine if the just-processed subimage 108 is the last subimage 108 in subimage-partitioned line-anomaly pixel map 110.

If the just-processed subimage 108 is not the last subimage 108, then procedure 40 points to the next subimage 108 and jumps back to task 114.

If the just-processed subimage 108 is the last subimage 108, then procedure 40 proceeds to a task 142. Task 142 produces anomaly subimage map 148 (FIG. 17).

Subimage-processing procedure 40 (FIG. 22) is now complete, and anomaly subimage map 148 becomes the input to object-processing procedure 42 (FIG. 1). In the alternative embodiment, object processing procedure 42 is as previously described.

Those skilled in the art will appreciate that images and maps discussed above in connection with the alternative embodiment may not, as those discussed in connection with the preferred embodiment, be images or maps in the human-readable sense. They may be collections or arrangements of data within a computer system used to implement process 30.

In summary, through the use of image processing at three levels, the present invention is able to determine efficiently and objectively the presence of anomalies 32 in a surface 36, thus facilitating the determination of surface 36 quality and the need and specific requirements of surface 36 repair. Process 30, while exemplified herein as a road-surface anomaly-detection and analysis process, is readily adaptable to a wide variety of surfaces over a wide variety of scales.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method for the detection and analysis of anomalies in a surface, said method comprising the steps of:

obtaining an image of said surface including at least one of said anomalies, wherein said one anomaly is a line anomaly;

filtering said image to enhance a depiction of said line anomaly by removing non-line-anomalous features of said image, said filtering step producing a line pixel map;

filtering said image to enhance a depiction of an area anomaly by removing non-area-anomalous features of said image, said filtering step producing an area pixel map;

combining said line pixel map and said area pixel map to produce a combined pixel map;

partitioning said combined pixel map into a multiplicity of subimages, wherein each of said subimages includes a plurality of pixels;

assigning a status characteristic to each of said subimages in response to any anomaly depicted therein;

forming an anomalous object in response to said status characteristics of said subimages, said anomalous object corresponding to said one anomaly in said surface; and producing an object map of said surface, said object map depicting a location of said anomalous object.

2. A method as claimed in claim 1 additionally comprising, prior to said line-anomaly filtering step, the step of masking, within said image, a predetermined non-anomalous feature of said surface so as to prevent one of said line-anomaly and area-anomaly filtering steps from enhancing a depiction of said predetermined non-anomalous feature.

3. A method as claimed in claim 2 wherein said surface is a road surface and said predetermined non-anomalous feature is a traffic control marking.

4. A method as claimed in claim 1 wherein, for each of said subimages, said assigning step comprises the steps of:

identifying parameters of said one anomaly;

comparing said identified parameters against predetermined parameters of a hypothetical anomaly; and determining said status characteristic of said subimage in response to said comparing step.

5. A method as claimed in claim 4 additionally comprising the step of defining said hypothetical anomaly by teaching an expert system.

6. A method as claimed in claim 4 wherein:

said determining step assigns a no-anomaly status characteristic to each of said subimages for which said comparing step indicates an absence of said one anomaly therein; and said determining step assigns an anomaly status characteristic to each of said subimages for which said comparing step indicates a presence of said one anomaly therein.

7. A method as claimed in claim 4 wherein said determining step comprises the step of examining, when results of said comparing step are ambiguous, adjacent subimages to refine said results.

8. A method as claimed in claim 1 wherein said forming step comprises the steps of:
   inspecting said subimages to determine which of said subimages have said one anomaly contained therein;
   grouping anomaly-containing subimages into said anomalous object when said anomaly-containing subimages are proximate each other;
   determining an object type for said anomalous object from spatial relationships between said anomaly-containing subimages and from said status characteristics of each of said anomaly-containing subimages; and
   assigning said object type to said anomalous object.

9. A method as claimed in claim 1 additionally comprising the step of identifying, prior to said producing step, a type for said anomalous object.

10. A method as claimed in claim 9 wherein said surface is a road surface, and said anomalous-object type is one of a crack, a seam, an edge, a sealed crack, a patch, and a pothole of said road surface.

11. A method as claimed in claim 10 wherein said crack is one of a dark crack and a light crack.

12. A method as claimed in claim 10 wherein said crack is one of a longitudinal crack, a transverse crack, an oblique crack, a fatigue crack, and a block crack.

13. A method as claimed in claim 9 wherein said object map additionally depicts said anomalous-object type.

14. A method for the detection and analysis of anomalies in a surface, said method comprising the steps of:
   obtaining an image of said surface including at least one of said anomalies, wherein said one anomaly is a line anomaly;
   filtering said image to enhance a depiction of said line anomaly by removing non-line-anomalous features of said image, said line-anomaly filtering step producing a line pixel map;
   partitioning said line pixel map into a multiplicity of line subimages, wherein each of said line subimages includes a plurality of pixels;
   assigning a status characteristic to each of said line subimages in response to any anomaly depicted therein;
   forming an anomalous object in response to said status characteristics of said line subimages, said anomalous object corresponding to said line anomaly in said surface;
   producing an object map of said surface, said object map depicting a location of said anomalous object;
   producing a line-subimage map depicting said line subimages and said status characteristics thereof;
   filtering said image to enhance a depiction of an area anomaly of said surface by removing non-area-anomalous features of said image, said area-anomaly filtering step producing an area pixel map;
   partitioning said area pixel map into a multiplicity of area subimages, wherein each of said area subimages includes a plurality of pixels;
   assigning a status characteristic to each of said area subimages in response to any area anomaly depicted therein;
   producing an area-subimage map depicting said area subimages and said status characteristics thereof; and
   fusing said line-subimage map and said area-subimage map to produce a fused subimage map so that each of said corresponding line and area subimages forms a fused subimage, and so that said forming step forms said anomalous object in response to said status characteristics of said fused subimages.

15. A method as claimed in claim 14 wherein:
   said surface is a road surface;
   said line anomaly is one of a crack, a seam, and an edge of said road surface; and
   said area anomaly is one of a sealed crack, a patch, and a pothole of said road surface.

16. A method as claimed in claim 14 wherein said area anomaly is a linear-area anomaly, said non-area-anomalous features are non-linear-area-anomalous features, and said area pixel map is a linear-area pixel map, and wherein said method additionally comprises the steps of:
   filtering said image to enhance a depiction of a block-area anomaly of said surface by removing non-block-area-anomalous features of said image, said block-area filtering step producing a block-area pixel map; and
   combining said linear-area pixel map and said block-area pixel map to produce a combined area pixel map so that said area-pixel-map partitioning step partitions said combined area pixel map.

17. A method as claimed in claim 16 wherein:
   said surface is a road surface;
   said linear-area anomaly is a sealed crack of said road surface; and
   said block-area anomaly is one of a patch and a pothole of said road surface.

18. A method for the detection and analysis of anomalies in a road surface, said method comprising the steps of:
   a) obtaining an image of said road surface including any number of said anomalies;
   b) filtering said image to enhance a depiction of a line anomaly of said surface by removing non-line-anomalous features of said image, said filtering step b) producing a line pixel map;
   c) partitioning said line pixel map into a multiplicity of line subimages, wherein each of said line subimages includes a plurality of pixels;
   d) assigning a status characteristic to each of said line subimages in response to any line anomaly depicted therein;
   e) producing a line-subimage map depicting said line subimages and said characteristics thereof;
   f) filtering said image to enhance a depiction of an area anomaly of said surface by removing non-area-anomalous features of said image, said filtering step f) producing an area pixel map;
   g) partitioning said area pixel map into a multiplicity of area subimages, wherein each of said area subimages includes a plurality of pixels;
   h) assigning a status characteristic to each of said area subimages in response to any area anomaly depicted therein;
   i) producing an area-subimage map depicting said area subimages and said characteristics thereof;
   j) fusing said line-subimage map and said area-subimage map to produce a fused subimage map so that each of said corresponding line and area subimages forms a fused subimage;

k) forming an anomalous object in response to said status characteristics of said fused subimages; and l) producing an object map of said road surface, said object map depicting said object.

19. A method as claimed in claim 18 additionally comprising, prior to said filtering steps b) and g), the step of masking, within said image, traffic control markings upon said road surface so as to prevent said filtering steps b) and g) from enhancing a depiction of said traffic control markings.

20. A method as claimed in claim 18 wherein said area anomaly is a linear-area anomaly, said non-anomalous features are non-linear-area-anomalous features, and said area pixel map is a linear-area pixel map, and wherein said method additionally comprises the steps of:

m) filtering said image to enhance a depiction of a block-area anomaly of said surface by removing non-block-area-anomalous features of said image, said filtering step m) producing a block-area pixel map; and n) combining said linear-area pixel map and said block-area pixel map to produce a combined area pixel map so that said partitioning step h) partitions said combined area pixel map.

21. A method as claimed in claim 18 additionally comprising the step of identifying, prior to said producing step 1), a type for said anomalous object, wherein said type is one of a crack, a seam, an edge, a sealed crack, a patch, and a pothole of said surface.

22. A method as claimed in claim 18 wherein, for each of said line subimages, said assigning step d) comprises the steps of:

identifying line parameters of said line anomaly;

comparing said line parameters against predetermined parameters of a hypothetical line anomaly; and determining said status characteristic of each of said line subimages in response to said comparing step for each of said line subimages.

23. A method as claimed in claim 18 wherein, for each of said area subimages, said assigning step i) comprises the steps of:

identifying area parameters of said area anomaly;

comparing said area parameters against predetermined parameters of a hypothetical area anomaly; and determining said status characteristic of each of said area subimages in response to said comparing step for each of said area subimages.

24. A method for the detection and analysis of anomalies in a road surface, said method comprising the steps of:

a) obtaining an image of said road surface including any number of said anomalies;

b) masking, within said image, traffic control markings upon said road surface;

c) filtering said image to enhance a depiction of a line anomaly, which includes a crack, a seam, and an edge of said road surface, by removing non-line-anomalous features of said image, said filtering step c) producing a line pixel map;

d) partitioning said line pixel map into a multiplicity of line subimages, wherein each of said line subimages includes a plurality of pixels;

e) identifying, for each of said line subimages, parameters of said line anomaly;

f) comparing, for each of said line subimages, said identified parameters against predetermined parameters of a hypothetical line anomaly;

g) assigning a status characteristic to each of said line subimages in response to said comparing step f);

h) producing a line-subimage map depicting said line subimages and said status characteristics thereof;

i) filtering said image to enhance a depiction of a linear-area anomaly, which includes a sealed crack of said road surface, by removing non-linear-area-anomalous features of said image, said linear-area-anomaly filtering step i) producing a linear-area pixel map;

j) filtering said image to enhance a depiction of a block-area anomaly, which includes one of a patch and a pothole of said road surface, by removing non-block-area-anomalous features of said image, said block-area-anomaly filtering step j) producing a block-area pixel map;

k) combining said linear-area pixel map and said block-area pixel map to produce a combined area pixel map;

l) partitioning said combined area pixel map into a multiplicity of area subimages, wherein each of said area subimages includes a plurality of pixels;

m) identifying, for each of said area subimages, parameters of an area anomaly contained therein, said area anomaly being one of said linear-area anomaly and said block-area anomaly;

n) comparing, for each of said area subimages, said identified parameters against predetermined parameters of a hypothetical area anomaly;

o) assigning a status characteristic to each of said area subimages in response to said comparing step n);

p) producing an area-subimage map depicting said area subimages and said status characteristics thereof;

q) fusing said line-subimage map and said area-subimage map to produce a fused subimage map so that each of said corresponding line and area subimages forms a fused subimage;

r) inspecting each of said fused subimages to determine which of said fused subimages is an anomaly-containing subimage having one of said line anomalies and said area anomalies contained therein;

s) grouping said anomaly-containing subimages into an object when said anomaly-containing subimages are proximate each other;

t) determining an object type, which indicates one of said crack, said seam, said edge, said sealed crack, said patch, and said pothole of said surface, for said object from spatial relationships between said anomaly-containing subimages and from said status characteristics thereof;

u) assigning said object type to said anomalous object; and v) producing an object map of said road surface, said object map depicting said anomalous object and said object type.

* * * * *